US009379783B2

(12) United States Patent
Kato et al.

(10) Patent No.: US 9,379,783 B2
(45) Date of Patent: Jun. 28, 2016

(54) TRANSMISSION SYSTEM

(71) Applicants: Yoshinaga Kato, Kanagawa (JP); Takahiro Asai, Kanagawa (JP); Akihiro Mihara, Tokyo (JP); Hiroaki Uchiyama, Kanagawa (JP)

(72) Inventors: Yoshinaga Kato, Kanagawa (JP); Takahiro Asai, Kanagawa (JP); Akihiro Mihara, Tokyo (JP); Hiroaki Uchiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 377 days.

(21) Appl. No.: 14/026,431

(22) Filed: Sep. 13, 2013

(65) Prior Publication Data
US 2014/0077937 A1 Mar. 20, 2014

(30) Foreign Application Priority Data

Sep. 14, 2012 (JP) ................................ 2012-203672
Sep. 14, 2012 (JP) ................................ 2012-203677
Sep. 14, 2012 (JP) ................................ 2012-203678

(51) Int. Cl.
*H04B 5/00* (2006.01)
*H04L 12/28* (2006.01)
(52) U.S. Cl.
CPC .......... *H04B 5/0062* (2013.01); *H04L 12/2876* (2013.01)
(58) Field of Classification Search
CPC .......................... H04B 5/0062; H04L 12/2876
USPC ................................................... 340/10.42
See application file for complete search history.

(56) References Cited

U.S. PATENT DOCUMENTS 5,815,080 A 9/1998 Taguchi
2008/0171511 A1* 7/2008 Sumita ................ H04B 7/2606
455/7

(Continued)

FOREIGN PATENT DOCUMENTS

JP 6-153188 5/1994
JP 2006-238386 9/2006

(Continued)

OTHER PUBLICATIONS

U.S. Appl. No. 14/008,228, filed Sep. 27, 2013, Kato.

(Continued)

*Primary Examiner* — Edwin Holloway, III
(74) *Attorney, Agent, or Firm* — Oblon, McClelland, Maier & Neustadt, L.L.P.

(57) ABSTRACT

A transmission system includes a transmission management system including: a first receiving unit that receives user identification information from transmission terminals; a user identification information management unit that stores user identification information in association with transmission terminal identification information of transmission terminals serving as transmission sources of the user identification information in the first storage unit; a first extracting unit that refers to, when the first receiving unit receives request for presentation from a certain transmission terminal, the first storage unit and extracts transmission terminal identification information of transmission terminals in transmission and user identification information associated with the transmission terminal identification information; and a second transmitting unit that transmits the extracted transmission terminal identification information and the extracted user identification information in association with each other to the transmission terminal serving as the transmission source of the request for presentation.

19 Claims, 27 Drawing Sheets

(56) References Cited

U.S. PATENT DOCUMENTS

| | | |
|---|---|---|
| 2009/0268009 A1 | 10/2009 | Oya |
| 2010/0250252 A1* | 9/2010 | Yasoshima .......... H04L 12/1827 704/246 |
| 2011/0137993 A1* | 6/2011 | Yi ....................... H04L 12/1822 709/204 |
| 2012/0002003 A1* | 1/2012 | Okita .................. H04L 12/1827 348/14.11 |
| 2012/0069132 A1* | 3/2012 | Kato ................... H04L 12/1827 348/14.02 |
| 2012/0079399 A1 | 3/2012 | Ferman et al. |
| 2013/0117373 A1 | 5/2013 | Umehara |

FOREIGN PATENT DOCUMENTS

| | | |
|---|---|---|
| JP | 2009-267968 | 11/2009 |
| JP | 2010-028506 | 2/2010 |
| JP | 2011-061314 | 3/2011 |
| JP | 4696481 | 3/2011 |
| JP | 2012-050063 | 3/2012 |
| JP | 2012-073898 | 4/2012 |
| JP | 2012-074040 | 4/2012 |
| JP | 2012-195926 | 10/2012 |

OTHER PUBLICATIONS

U.S. Appl. No. 14/008,228, filed Sep. 27, 2013.

* cited by examiner

FIG.8

| BLOCK No. | DATA |
|---|---|
| 1 (UNIQUE NUMBER) | 1234567 |
| 2 (USER NAME) | Jiro Kanagawa |
| ... | ... |
| ... | ... |

FIG.9

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.10

TERMINAL MANAGEMENT TABLE

| TERMI-NAL ID | TERMINAL NAME | TRANSMISSION STATE | RECEPTION DATE AND TIME | IP ADDRESS OF TERMINAL | PARTICIPANT NAME |
|---|---|---|---|---|---|
| 01aa | AA TERMINAL AT TOKYO OFFICE IN JAPAN | ON-LINE (IN TRANSMISSION) | 2009.11.10.13:40 | 1.2.1.3 | Taro Tokyo |
| 01ab | AB TERMINAL AT TOKYO OFFICE IN JAPAN | OFF-LINE | 2009.11.09.12:00 | 1.2.1.4 | |
| ... | ... | ... | ... | ... | ... |
| 01ba | BA TERMINAL AT OSAKA OFFICE IN JAPAN | ON-LINE (CAPABLE OF TRANSMISSION) | 2009.11.10.13:45 | 1.2.2.3 | Taro Osaka |
| 01bb | BB TERMINAL AT OSAKA OFFICE IN JAPAN | ON-LINE (CAPABLE OF TRANSMISSION) | 2009.11.10.13:50 | 1.2.2.4 | |
| ... | ... | ... | ... | ... | ... |
| 01ca | CA TERMINAL AT NEW YORK OFFICE IN THE UNITED STATES | OFF-LINE | 2009.11.10.12:45 | 1.3.1.3 | |
| 01cb | CB TERMINAL AT NEW YORK OFFICE IN THE UNITED STATES | ON-LINE (IN TRANSMISSION) | 2009.11.10.13:55 | 1.3.1.4 | Mike Smith |
| ... | ... | ... | ... | ... | ... |
| 01da | DA TERMINAL AT WASHINGTON, D.C. OFFICE IN THE UNITED STATES | OFF-LINE | 2009.11.08.12:45 | 1.3.2.3 | |
| 01db | DB TERMINAL AT WASHINGTON, D.C. OFFICE IN THE UNITED STATES | ON-LINE (IN TRANSMISSION) | 2009.11.10.12:45 | 1.3.2.4 | Raquel Rodrriguez |
| ... | ... | ... | ... | ... | ... |

FIG.11

DESTINATION LIST MANAGEMENT TABLE

| REQUESTOR TERMINAL ID | DESTINATION TERMINAL ID |
|---|---|
| 01aa | 01ab, 01ba, 01db |
| 01ab | 01aa, 01ca, 01cb |
| 01ba | 01aa, 01ab, 01ca, 01cb, 01da, 01db |
| 01cb | 01db |
| ... | ... |
| 01db | 01aa, 01ab, 01ba, ···, 01da, 01ca, 01cb, ···, 01da |

TERMINAL MANAGEMENT TABLE

| TERMINAL ID | ... | PARTICIPANT NAME |
|---|---|---|
| 01aa | | Taro Tokyo, Jiro Kanagawa  |
| 01ab | | |
| ... | ... | ... |
| 01ba | | |
| 01bb | | |
| ... | ... | ... |
| 01ca | | |
| 01cb | | Mike Smith |
| ... | ... | ... |
| 01da | | |
| 01db | | Raquel Rodrriguez |
| ... | ... | ... |

FIG.22

USER NAME TABLE
(STORAGE UNIT 1000)

| UNIQUE NUMBER | Name |
|---|---|
| 1234568 | Taro Tokyo |
| 1234567 | Jiro Kanagawa |
| ... | ... |
| ... | ... |

TRANSMISSION SYSTEM

CROSS-REFERENCE TO RELATED APPLICATIONS

The present application claims priority to and incorporates by reference the entire contents of Japanese Patent Application No. 2012-203672 filed in Japan on Sep. 14, 2012, Japanese Patent Application No. 2012-203677 filed in Japan on Sep. 14, 2012, and Japanese Patent Application No. 2012-203678 filed in Japan on Sep. 14, 2012.

BACKGROUND OF THE INVENTION

1. Field of the Invention

The present invention relates to a transmission system.

2. Description of the Related Art

Remote conference systems realize a state close to an actual conference by: acquiring images and audio in a conference room where participants of a remote conference are present by capturing the images of the participants and collecting sounds, such as remarks made by the participants; converting the acquired images and the acquired audio into digital data with a transmission terminal and transmitting the digital data to a transmission terminal of a destination; and causing a display, such as a video screen, to display the images and causing a speaker to output the audio in a conference room of the destination.

There has been developed a technology for holding a remote conference among multiple points with such a remote conference system. The technology holds a remote conference by connecting all the transmission terminals that participate in the conference to a relay apparatus and causing the relay apparatus to control distribution of image data and audio data to each of the transmission terminals.

There has also been developed a technology for displaying a list of prospective conference participants on a screen of a certain transmission terminal in a remote conference held among multiple points so as to allow a user using the certain transmission terminal to find who are participating in the conference with other transmission terminals during the conference. Japanese Patent No. 4696481, for example, discloses a technology for displaying positional information of point systems holding a conference in association with images (face images) of conference participants at respective points. Japanese Patent No. 4696481 further discloses a technology for displaying a face image of a user who has already participated in the conference by reading an image of a conference participant recorded in an integrated circuit (IC) card when the conference participant joins the conference and displaying only a name for a user who is not participating in the conference.

In the conventional technology, however, it is necessary to register participants in advance. Participation of an unregistered participant who is unexpected at the conference prevents the participants using other transmission terminals from grasping who the unregistered participant is because he/she is unregistered.

To grasp who is participating in the conference, the participants using the other transmission terminals need to perform an operation for asking a destination point who is participating in the conference, for example, by audio.

SUMMARY OF THE INVENTION

It is an object of the present invention to at least partially solve the problems in the conventional technology.

A transmission system includes: a plurality of transmission terminals; and a transmission management system that manages the transmission terminals. Each of the transmission terminals includes: an acquiring unit that acquires user identification information identifying a user from a device that stores therein the user identification information; and a first transmitting unit that transmits the user identification information to the transmission management system, the transmission management system includes: a first storage unit that stores therein transmission terminal identification information identifying the transmission terminals and transmission states indicating whether the transmission terminals are in transmission in association with each other; a first receiving unit that receives the user identification information from the transmission terminals; and a user identification information management unit that stores user identification information in association with the transmission terminal identification information of a transmission terminal serving as a transmission source of the user identification information in the first storage unit. The first transmitting unit of each of the transmission terminals transmits a request for presentation of information relating to transmission terminals in the transmission, to the transmission management system. The transmission management system further includes: a first extracting unit that refers to, when the first receiving unit receives the request for presentation from a certain transmission terminal, the first storage unit and extracts transmission terminal identification information of the transmission terminals in the transmission and user identification information associated with the transmission terminal identification information; and a second transmitting unit that transmits the extracted transmission terminal identification information and the extracted user identification information in association with each other to the transmission terminal serving as the transmission source of the request for presentation. Each of the transmission terminals further includes: a second receiving unit that receives the transmission terminal identification information and the user identification information; and a display control unit that displays the transmission terminal identification information and the user identification information received by the second receiving unit in association with each other on a display unit.

A transmission system includes: a plurality of transmission terminals; and a transmission management system that manages the transmission terminals. Each of the transmission terminals includes: an acquiring unit that acquires user identification information identifying a user from a device that stores therein the user identification information; and a first transmitting unit that transmits the user identification information to the transmission management system. The transmission management system includes: a first storage unit that stores therein transmission terminal identification information identifying the transmission terminals and transmission states indicating whether the transmission terminals are in transmission in association with each other; a first receiving unit that receives the user identification information from the transmission terminals; a transmission terminal identification information extracting unit that extracts, when the first receiving unit receives the user identification information, transmission terminal identification information associated with the transmission state of an in-transmission state from the first storage unit; and a second transmitting unit that transmits the user identification information received by the first receiving unit and transmission terminal identification information of a transmission terminal serving as a transmission source of the user identification information in association with each other to a transmission terminal in the transmission. Each of the transmission terminals further includes: a second receiving unit that receives the transmission terminal identification information and the user identification information; and a display control unit that displays the transmission terminal identification information and the user identification information received by the second receiving unit in association with each other on a display unit.

A transmission system includes: a plurality of transmission terminals; and a transmission management system that manages the transmission terminals. Each of the transmission terminals includes: an acquiring unit that acquires user identification information identifying a user from a device that stores therein the user identification information; and a first transmitting unit that transmits the user identification information to the transmission management system. The transmission management system includes: a first receiving unit that receives the user identification information from the transmission terminals; a destination terminal identification information storage unit that stores therein transmission terminal identification information identifying a requestor terminal serving as a transmission terminal of a request for the transmission and transmission terminal identification information identifying a destination terminal serving as a transmission terminal of a destination of the request for the transmission in association with each other; a requestor terminal identification information extracting unit that refers to the destination terminal identification information storage unit and extracts transmission terminal identification information of a requestor terminal with which a transmission terminal serving as a transmission source of user identification information received by the first receiving unit is associated as a destination terminal; and a first transmitting unit that transmits the user identification information and the transmission terminal identification information of the transmission terminal serving as the transmission source of the user identification information in association with each other to the requestor terminal extracted by the requestor terminal identification information extracting unit. Each of the transmission terminals further includes: a second receiving unit that receives the transmission terminal identification information and the user identification information; and a display control unit that displays the transmission terminal identification information and the user identification information received by the second receiving unit in association with each other on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a conceptual view of a storage unit of an NFC tag;
FIG. 9 is a conceptual view of a terminal authentication management table;
FIG. 10 is a conceptual view of a terminal management table;
FIG. 11 is a conceptual view of a destination list management table;
FIG. 22 is a conceptual view of a user name table.

DETAILED DESCRIPTION OF THE PREFERRED EMBODIMENTS

Exemplary embodiments according to the present invention are described below.

First Embodiment

Entire Configuration of the Embodiment

Figure 1:
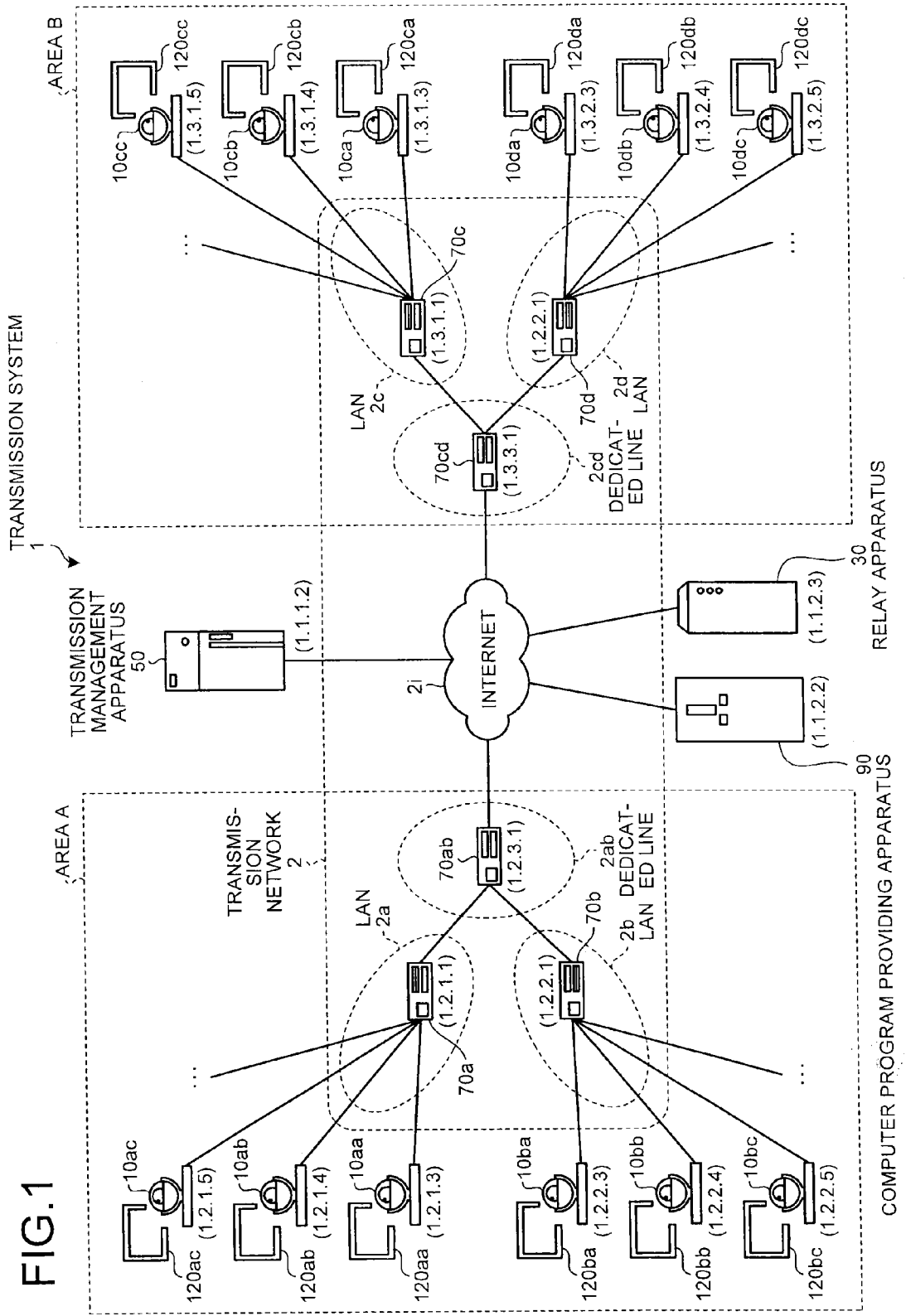
FIG. 1 is a schematic of a configuration of a transmission system.
Figure 2:
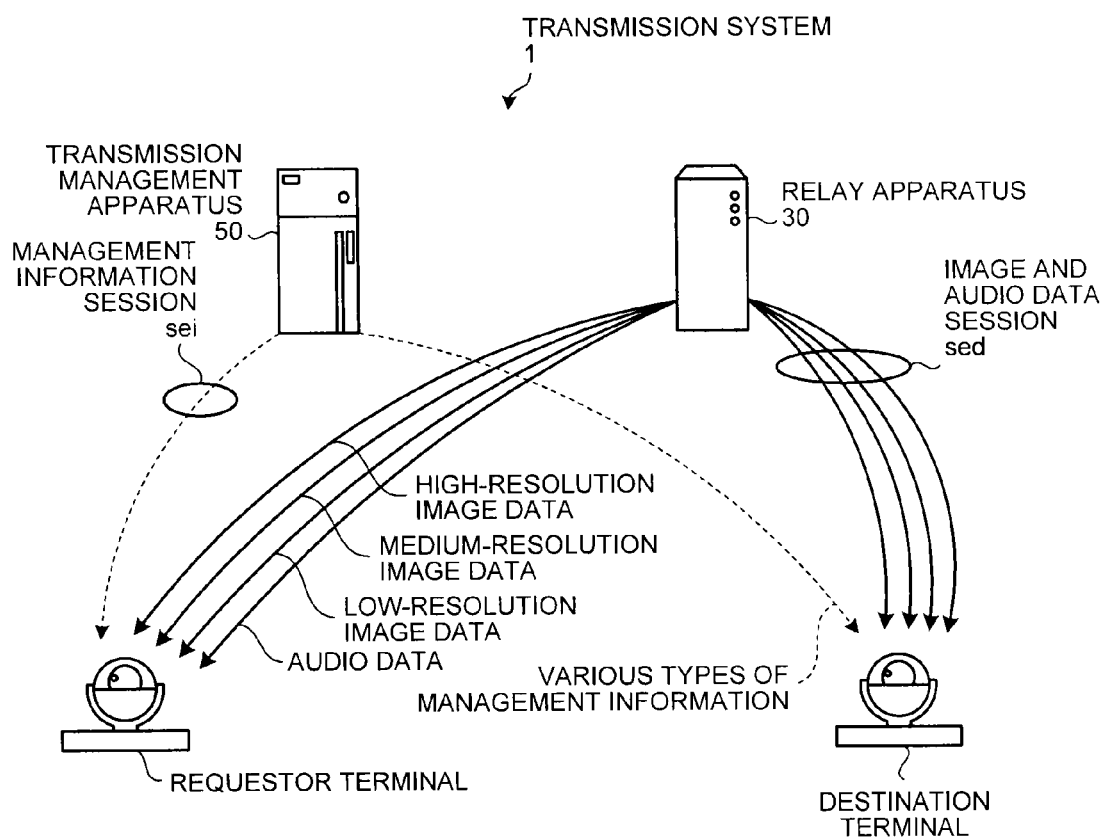
FIG. 2 is a conceptual view illustrating a state of transmission and reception of image data, audio data, and various types of management information in the transmission system.
Figure 3:
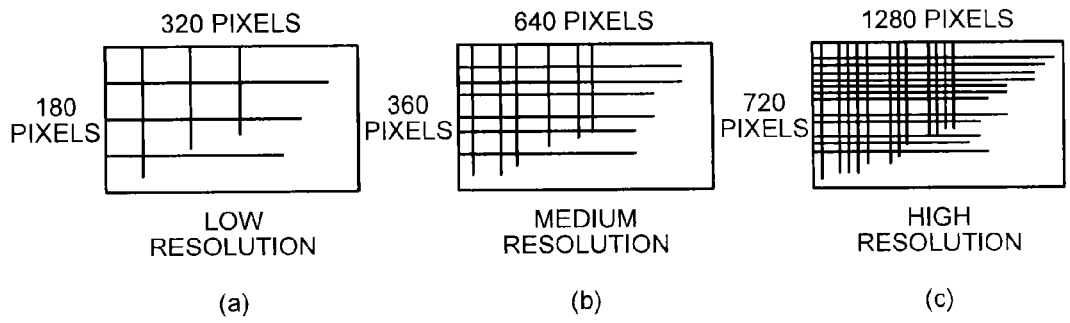
FIG. 3 is a conceptual view for explaining the image quality of the image data.

FIG. 1 is a schematic of a transmission system 1 according to a first embodiment of the present invention. FIG. 2 is a conceptual view illustrating a state of transmission and reception of image data, audio data, and various types of management information in the transmission system 1. FIG. 3 is a conceptual view for explaining the image quality of the image data.

The transmission system includes a data providing system and a communication system. The data providing system unidirectionally transmits content data from one transmission terminal to a plurality of transmission terminals via a transmission management apparatus. The communication system mutually transmits information, feelings, and the like among a plurality of transmission terminals via a transmission management apparatus. The communication system mutually transmits information, feelings, and the like among a plurality of communication terminals (corresponding to the "transmission terminals") via a communication management apparatus (corresponding to the "transmission management apparatus"). Examples of the communication system include a video conference system and a video phone system.

In the present embodiment, the transmission system, the transmission management apparatus, and the transmission terminal are explained using a video conference system as an example of the communication system, a video conference management apparatus as an example of the communication management apparatus, and a video conference terminal as an example of the communication terminal, respectively. In other words, the transmission terminal and the transmission management apparatus according to the present invention are not necessarily applied to a video conference system and may be applied to a communication system or a data transmission system.

As illustrated in FIG. 1, the transmission system 1 includes a plurality of transmission terminals 10aa, 10ab, . . . , displays 120aa, 120ab, . . . for the respective transmission terminals 10aa, 10ab, . . . , a relay apparatuses 30, a transmission management apparatus 50 serving as the transmission management system, and a computer program providing apparatus 90. The transmission terminals 10aa, 10ab, . . . , transmit and receive image data and audio data as the content data, for example.

In the description below, an arbitrary transmission terminal among the transmission terminals 10aa, 10ab, . . . , is referred to as a "transmission terminal 10". An arbitrary display among the displays 120aa, 120ab, . . . is referred to as a "display 120". A transmission terminal 10 serving as a requestor that requests start of a video conference is referred to as a "requestor terminal". A transmission terminal 10 serving as a destination is referred to as a "destination terminal".

As illustrated in FIG. 2, the transmission system 1 establishes a management information session sei between the requestor terminal and the destination terminal. The management information session sei is used to transmit and receive various types of management information via the transmission management apparatus 50.

The transmission system 1 further establishes four sessions between the transmission terminals 10 between which the management information session sei is established. The four sessions are used to transmit and receive four types of data including high-resolution image data, medium-resolution image data, low-resolution image data, and audio data via the relay apparatus 30. In the present embodiment, the four sessions are collectively referred to as an "image and audio data session sed".

The image data in the present embodiment is encoded in a scalable manner. The image data in the present embodiment, for example, includes the following image data: low-resolution image data serving as a base image and composed of 320 horizontal pixels×180 vertical pixels as illustrated in FIG. 3A; medium-resolution image data composed of 640 horizontal pixels×360 vertical pixels as illustrated in FIG. 3B; and high-resolution image data composed of 1280 horizontal pixels×720 vertical pixels as illustrated in FIG. 3C.

With a narrow band to transmit image data, the low-resolution image data serving as the base image alone is transmitted. The transmission terminal 10 serving as a receiver can display a low-quality image alone based on the transmitted low-resolution image data.

With a relatively broad band to transmit image data, the low-resolution image data serving as the base image and the medium-resolution image data are transmitted. The transmission terminal 10 serving as the receiver can display a medium-quality image based on the transmitted low-resolution image data and the transmitted medium-resolution image data.

With a considerably broad band to transmit image data, the low-resolution image data serving as the base image, the medium-resolution image data, and the high-resolution image data are transmitted. The transmission terminal 10 serving as the receiver can display a high-quality image based on the transmitted low-resolution image data, the transmitted medium-resolution image data, and the transmitted high-resolution image data.

In FIG. 1, the relay apparatus 30 relays content data among the transmission terminals 10. The transmission management apparatus 50 centrally manages login authentication of the transmission terminals 10, the transmission state of the transmission terminals 10, a destination list, and the transmission state of the relay apparatus 30, for example. An image represented by the image data may be a moving image or a still image or may be both a moving image and a still image.

A plurality of routers 70a, 70b, 70c, 70d, 70ab, and 70cd select the optimum path for the image data and the audio data. In the description below, an arbitrary router among the routers 70a, 70b, 70c, 70d, 70ab, and 70cd is referred to as a "router 70".

The computer program providing apparatus 90 includes a hard disk (HD) 204, which will be described later, stores therein a transmission terminal control program for causing the transmission terminal 10 to perform various types of functions, and can transmit the transmission terminal control program to the transmission terminal 10.

The HD 204 of the computer program providing apparatus 90 further stores therein a relay apparatus program for causing the relay apparatus 30 to perform various types of functions. The computer program providing apparatus 90 can transmit the relay apparatus program to the relay apparatus 30.

The HD 204 of the computer program providing apparatus 90 further stores therein a transmission management program for causing the transmission management apparatus 50 to perform various types of functions. The computer program providing apparatus 90 can transmit the transmission management program to the transmission management apparatus 50.

The transmission terminals 10aa, 10ab, 10ac, . . . are connected to the router 70a in a transmittable manner via a local area network (LAN) 2a. The transmission terminals 10ba, 10bb, 10bc, . . . are connected to the router 70b in a transmittable manner via a LAN 2b.

The LAN 2a and the LAN 2b are connected in a transmittable manner via a dedicated line tab including the router 70ab and are provided in a certain area A. The area A is Japan, for example. The LAN 2a is provided in a Tokyo office, and the LAN 2b is provided in an Osaka office, for example.

The transmission terminals 10ca, 10cb, 10cc, . . . are connected to the router 70c in a transmittable manner via a LAN 2c. The transmission terminals 10da, 10db, 10dc, . . . are connected to the router 70d in a transmittable manner via a LAN 2d.

The LAN 2c and the LAN 2d are connected in a transmittable manner via a dedicated line 2cd including the router 70cd and are provided in a certain area B. The area B is the United States, for example. The LAN 2c is provided in a New York office, and the LAN 2d is provided in a Washington, D.C. office, for example. The area A and the area B are connected in a manner transmittable to each other via the Internet 2i with the routers 70ab and 70cd, respectively.

The relay apparatus 30, the transmission management apparatus 50, and the computer program providing apparatus 90 are connected to each transmission terminal 10 in a transmittable manner via the Internet 2i. The relay apparatus 30, the transmission management apparatus 50, and the computer program providing apparatus 90 may be located in the area A or the area B, or at areas other than the area A and the area B.

In the present embodiment, the LAN 2a, the LAN 2b, the dedicated line 2ab, the Internet 2i, the dedicated line 2cd, the LAN 2c, and the LAN 2d form a transmission network 2 according to the present embodiment. The transmission network 2 may include a section in which wireless transmission is performed using Wireless Fidelity (Wi-Fi), Bluetooth (registered trademark), or the like besides a section for wired transmission.

In FIG. 1, quaternary numbers each written under the transmission terminals 10, the relay apparatus 30, the transmission management apparatus 50, the routers 70, and the computer program providing apparatus 90 simply indicate an Internet Protocol (IP) address in the IPv4 commonly used. The IP address of the transmission terminal 10aa is "1.2.1.3", for example. While the IPv6 may be used instead of the IPv4, the IPv4 is used for the convenience of explanation.

The transmission terminals 10 may be used for a video conference in a single room and a video conference between outdoor and indoor or between outdoor and outdoor besides for a video conference among a plurality of offices and a video conference among different rooms in a single office. In use of the transmission terminals 10 outdoor, wireless transmission is performed using a mobile phone transmission network, for example.

Hardware Configuration of the Embodiment

Figure 4:
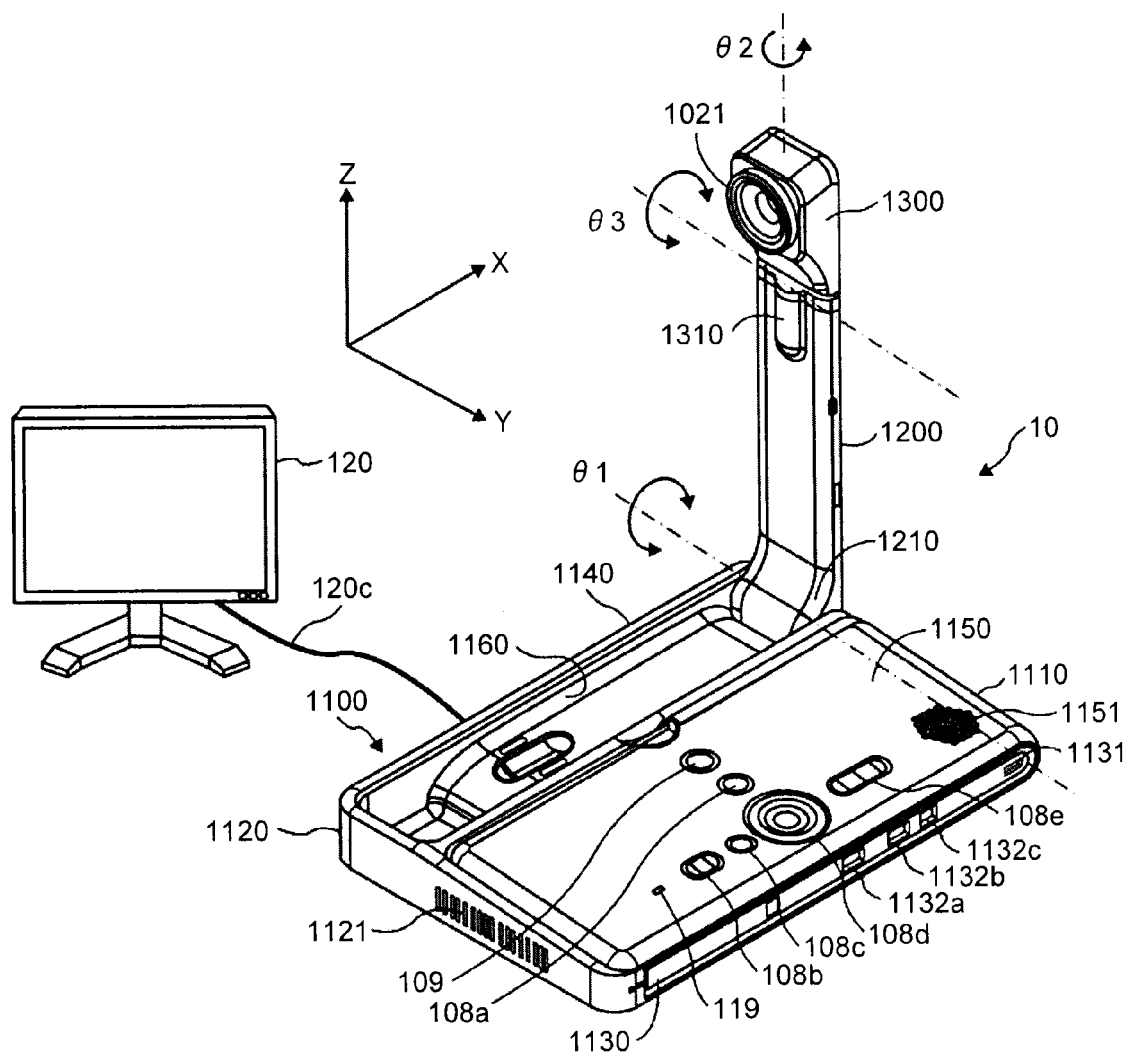
FIG. 4 is an external view of a transmission terminal.

As illustrated in FIG. 4, the transmission terminal 10 includes a housing 1100, an arm 1200, and a camera housing 1300. A front-side wall 1110 of the housing 1100 is provided with an inlet surface, which is not illustrated, formed of a plurality of inlet holes. A rear-side wall 1120 of the housing 1100 is provided with an outlet surface 1121 formed of a plurality of outlet holes. With this configuration, driving a cooling fan accommodated in the housing 1100 can introduce outside air behind the transmission terminal 10 through the inlet surface, which is not illustrated, and exhaust the outside air toward behind the transmission terminal 10 through the outlet surface 1121. A sound collecting hole 1131 is formed on a right-side wall 1130 of the housing 1100, and sound including audio, sound, and noise can be collected therethrough by a built-in microphone 114, which will be described later.

An operation panel 1150 is formed on the right-side wall 1130 side of the housing 1100. The operation panel 1150 is provided with a plurality of operation buttons (108a to 108e), a power switch 109, and an alarm lamp 119, each of which will be described later. In addition, the operation panel 1150 has a sound output surface 1151 formed of a plurality of audio output holes through which output sound from a built-in speaker 115, which will be described later, is output.

An accommodating unit 1160 is formed on the left-side wall 1140 side of the housing 1100. The accommodating unit 1160 serves as a recess that accommodates the arm 1200 and the camera housing 1300. The right-side wall 1130 of the housing 1100 is provided with a plurality of connection ports (1132a to 1132c) through which a cable is electrically connected to an external device connection interface (I/F) 118, which will be described later. By contrast, the left-side wall 1140 of the housing 1100 is provided with a connection port, which is not illustrated, through which a cable 120c for the display 120 is electrically connected to the external device connection I/F 118, which will be described later.

In the description below, an arbitrary operation button among the operation buttons (108a to 108e) is referred to as an "operation button 108". An arbitrary connection port among the connection ports (1132a to 1132c) is referred to as a "connection port 1132".

The arm 1200 is attached to the housing 1100 via a torque hinge 1210. The arm 1200 is attached to the housing 1100 in a rotatable manner within a range of a tilt angle θ1 of 135 degrees in the vertical direction. FIG. 2 illustrates a state where the tilt angle θ1 is 90 degrees.

The camera housing 1300 is provided with a built-in camera 112, which will be described later, and the camera 112 can capture a user, a document, and a room, for example. The camera housing 1300 is further provided with a torque hinge 1310 and is attached to the arm 1200 via the torque hinge 1310. The camera housing 1300 is attached to the arm 1200 via the torque hinge 1310 in a rotatable manner within a range of a pan angle θ2 of ±180 degrees in the horizontal direction and within a range of a tilt angle θ3 of ±45 degrees in the vertical direction with respect to the arm 1200 defining that the state illustrated in FIG. 2 is 0 degrees.

Alternatively, the terminal 10 may be a typical general-purpose computer, for example. If no microphone or no camera is provided to the computer used as the terminal 10, an external microphone and an external camera are connected to the computer. This enables use of the general-purpose computer as the terminal 10 according to the present embodiment. To use a general-purpose computer as the terminal 10, an application that performs processing of the terminal 10, which will be described later, is installed in the computer.

Figure 5:
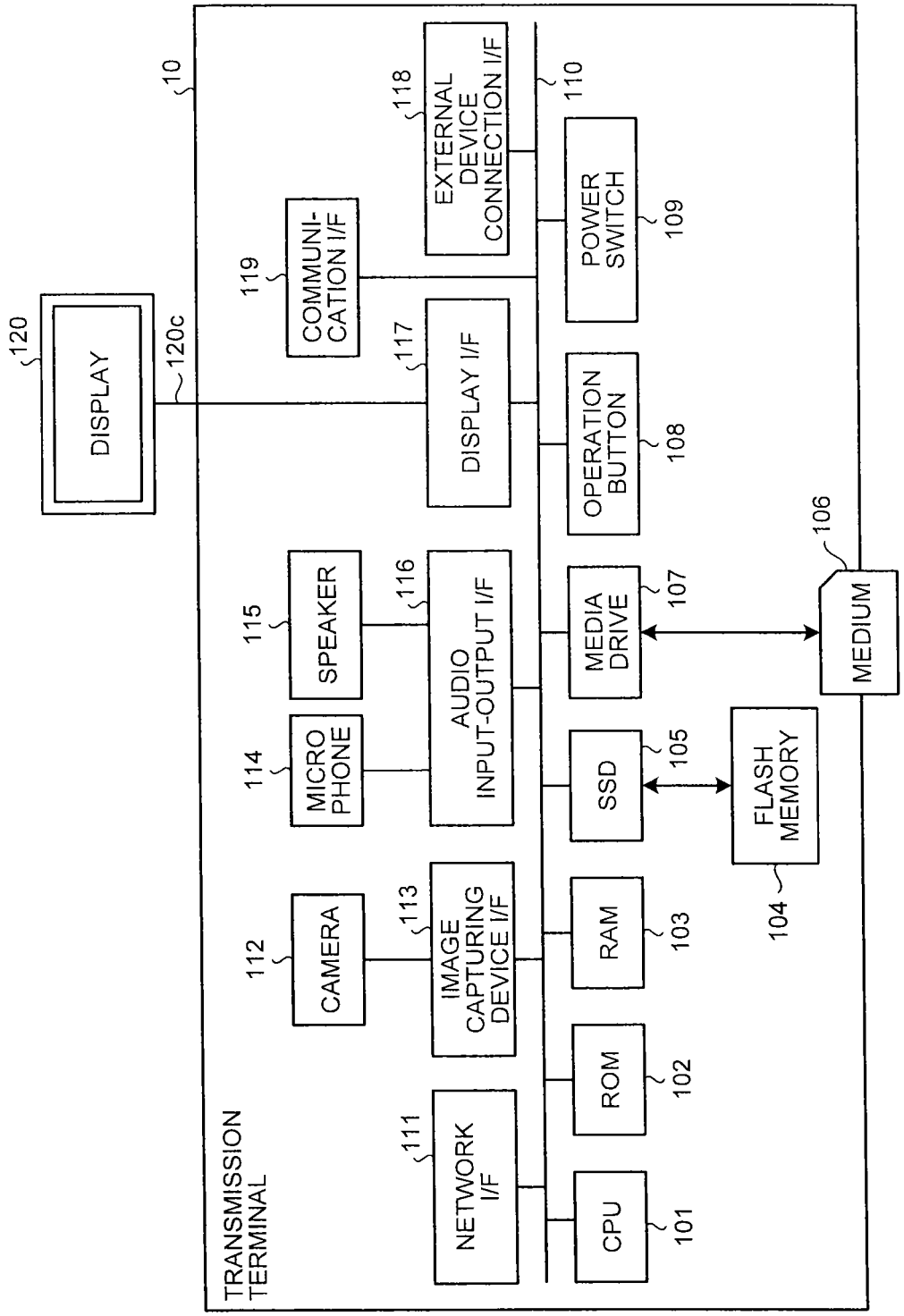
FIG. 5 is a diagram of a hardware configuration of the transmission terminal.

As illustrated in FIG. 5, the transmission terminal 10 includes a central processing unit (CPU) 101, a read-only memory (ROM) 102, a random access memory (RAM) 103, a flash memory 104, a solid state drive (SSD) 105, a media drive 107, the operation button 108, the power switch 109, and a network interface (I/F) 111. The CPU 101 collectively controls operations of the transmission terminal 10. The ROM 102 stores therein a computer program, such as an initial program loader (IPL), used to drive the CPU 101. The RAM 103 is used as a work area for the CPU 101. The flash memory 104 stores therein various types of data, such as the transmission terminal control program, image data, and audio data. The SSD 105 controls reading or writing various types of data from or to the flash memory 104 under the control of the CPU 101. The media drive 107 controls reading or writing (storing) data from or to a recording medium 106, such as a flash memory. The operation button 108 is operated to select a destination of the transmission terminal 10, for example. The power switch 109 is used to switch ON/OFF the power of the transmission terminal 10. The network I/F 111 transmits data via the transmission network 2.

The transmission terminal 10 further includes the built-in camera 112, an image capturing device I/F 113, the microphone 114, the built-in speaker 115, an audio input-output I/F 116, a display I/F 117, the external device connection I/F 118, a communication I/F 119, and a bus line 110. The camera 112 captures a subject to acquire image data under the control of the CPU 101. The image capturing device I/F 113 controls driving of the camera 112. The microphone 114 serves as a built-in sound collecting device that receives audio. The speaker 115 outputs audio. The audio input-output I/F 116 performs input and output processing of an audio signal between the microphone 114 and the speaker 115 under the control of the CPU 101. The display I/F 117 transmits image data to the external display 120 under the control of the CPU 101. The external device connection I/F 118 is used to connect various types of external devices. The communication I/F 119 performs wireless communication with a near field communication (NFC) tag 22, which will be described later, via NFC conforming to a non-contact IC wireless communication standard. The bus line 110, such as an address bus and a data bus, electrically connects these components described above.

The display 120 is a display device that is formed of a liquid crystal or an organic electroluminescence (EL) and that displays an image of the subject and an operation icon, for example. The display 120 is connected to the display I/F 117 via the cable 120c. The cable 120c may be a cable for an analog RGB (VGA) signal, a cable for component video, or a cable for a high-definition multimedia interface (HDMI) signal or a digital video interactive (DVI) signal.

The camera 112 includes a lens and a solid-state image capturing device that converts light into an electric charge to computerize an image of the subject. Examples of the solid-state image capturing device include a complementary metal oxide semiconductor (CMOS) and a charge coupled device (CCD).

An external device, such as an external camera, an external microphone, and an external speaker, can be connected to the external device connection I/F 118 with a universal serial bus (USB) cable, for example.

If an external camera is connected to the external device connection I/F 118, the CPU 101 drives the external camera prior to the built-in camera 112. If an external microphone or an external speaker is connected to the external device connection I/F 118, the CPU 101 drives the external microphone or the external speaker prior to the built-in microphone 114 or the built-in speaker 115, respectively.

The recording medium 106 is attachable and detachable to and from the transmission terminal 10. Instead of the flash memory 104, an electrically erasable and programmable ROM (EEPROM) may be used, for example, as long as the memory is a non-volatile memory from or to which the transmission terminal 10 reads or writes data under the control of the CPU 101.

The transmission terminal control program may be distributed in a manner recorded in a computer-readable recording medium, such as the recording medium 106, as a file in an installable or executable format. Furthermore, the transmission terminal control program may be stored not in the flash memory 104 but in the ROM 102.

Figure 6:
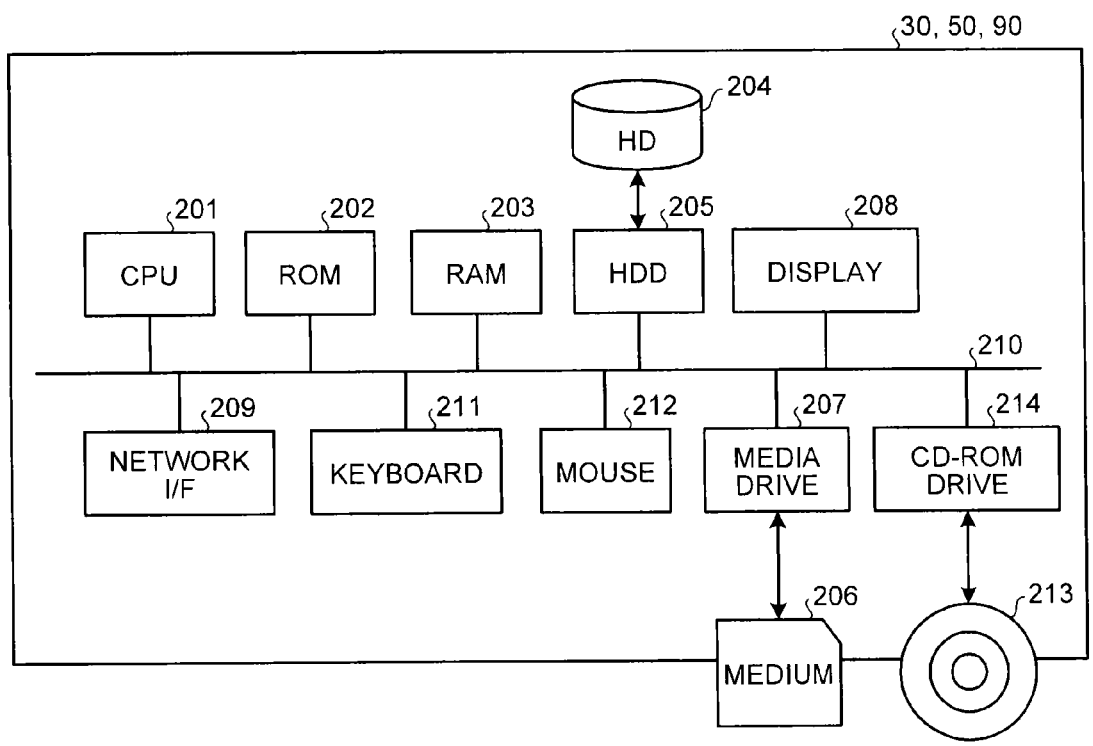
FIG. 6 is a diagram of a hardware configuration of a transmission management apparatus, a relay apparatus, or a computer program providing apparatus.

As illustrated in FIG. 6, the transmission management apparatus 50 includes a CPU 201, a ROM 202, a RAM 203, an HD 204, a hard disk drive (HDD) 205, a media drive 207, a display 208, a network I/F 209, a keyboard 211, a mouse 212, a compact disc read-only memory (CD-ROM) drive 214, and a bus line 210. The CPU 201 collectively controls operations of the transmission management apparatus 50. The ROM 202 stores therein a computer program, such as an IPL, used to drive the CPU 201. The RAM 203 is used as a work area for the CPU 201. The HD 204 stores therein various types of data, such as the transmission management program. The HDD 205 controls reading or writing various types of data from or to the HD 204 under the control of the CPU 201. The media drive 207 controls reading or writing (storing) data from or to a recording medium 206, such as a flash memory. The display 208 displays various types of information, such as a cursor, a menu, a window, a character, and an image. The network I/F 209 transmits data via the transmission network 2. The keyboard 211 includes a plurality of keys used to input a character, a value, and various types of instructions, for example. The mouse 212 selects and performs various types of instructions, selects a target to be processed, and moves the cursor, for example. The CD-ROM drive 214 controls reading or writing various types of data from or to a CD-ROM 213 serving as an example of a detachable recording medium. The bus line 210, such as an address bus and a data bus, electrically connects these components described above.

The transmission management program may be distributed in a manner recorded in a computer-readable recording medium, such as the recording medium 206 and the CD-ROM 213, as a file in an installable or executable format. Furthermore, the transmission management program may be stored not in the HD 204 but in the ROM 202.

Because the relay apparatus 30 has a hardware configuration similar to that of the transmission management apparatus 50, the explanation thereof is omitted. However, an HD 204 stores therein the relay apparatus program for controlling the relay apparatus 30.

In this case as well, the relay apparatus program may be distributed in a manner recorded in a computer-readable recording medium, such as a recording medium 206 and a CD-ROM 213, as a file in an installable or executable format. Furthermore, the relay apparatus program may be stored not in the HD 204 but in a ROM 202.

Because the computer program providing apparatus 90 has a hardware configuration similar to that of the transmission management apparatus 50, the explanation thereof is omitted. However, the HD 204 stores therein a computer program providing apparatus program for controlling the computer program providing apparatus 90.

In this case as well, the computer program providing apparatus program may be distributed in a manner recorded in a computer-readable recording medium, such as a recording medium 206 and a CD-ROM 213, as a file in an installable or executable format. Furthermore, the computer program providing apparatus program may be stored not in the HD 204 but in a ROM 202.

Various types of media may be used as the computer-readable recording medium described above, including a compact disc recordable (CD-R), a digital versatile disk (DVD), and a Blu-ray Disc (trademark).

Functional Configuration of the Embodiment

Figure 7:
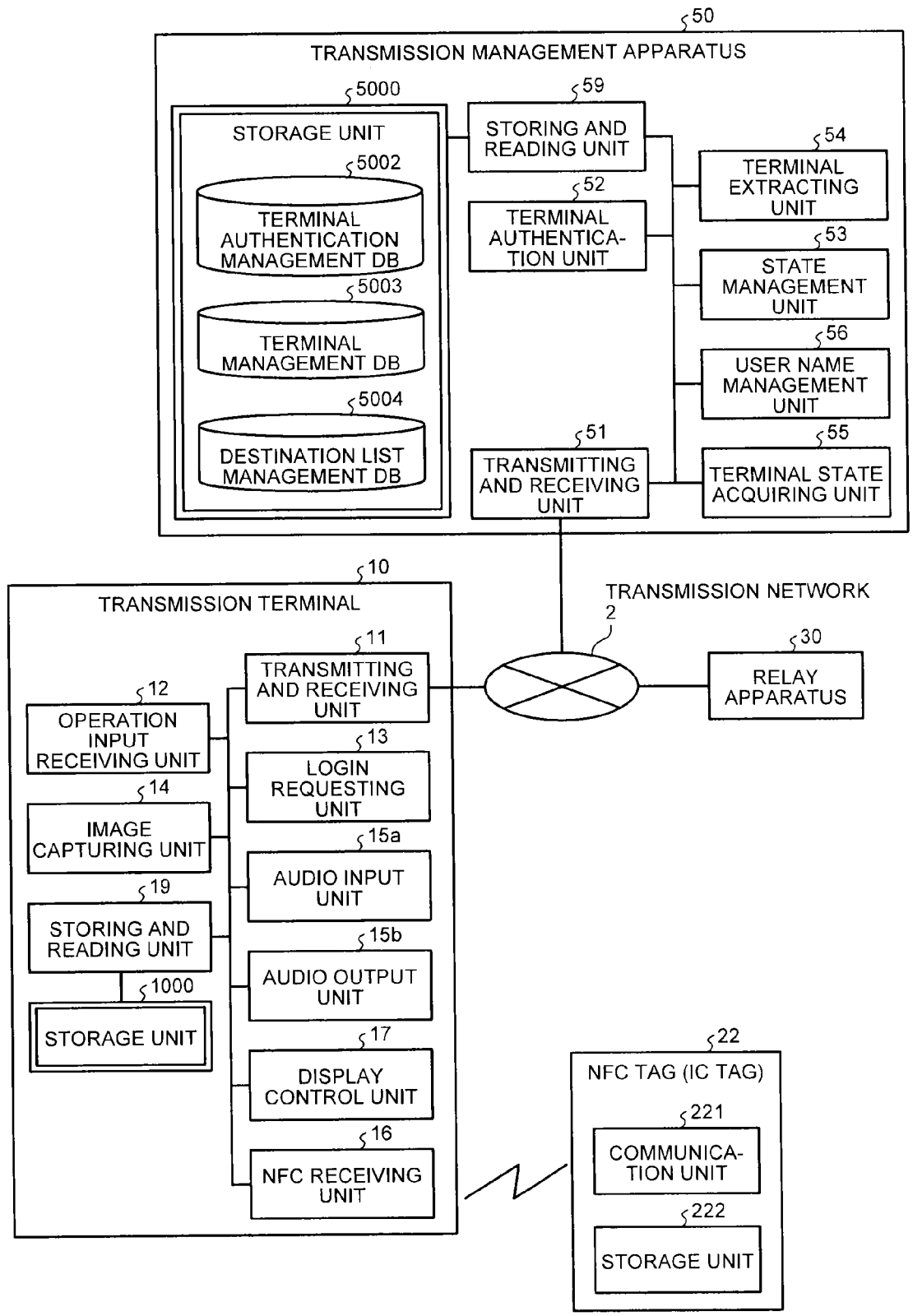
FIG. 7 is a functional block diagram of the transmission terminal and a transmission management system.

As illustrated in FIG. 7, the transmission terminal 10, the relay apparatus 30, and the transmission management apparatus 50 are connected to one another so as to transmit data via the transmission network 2. The transmission terminal 10 establishes NFC with the NFC tag 22 via the communication I/F 119 illustrated in FIG. 5, thereby acquiring data from the NFC tag 22. Because the computer program providing apparatus 90 illustrated in FIG. 1 does not directly relate to transmission of data for a video conference, the computer program providing apparatus 90 is not illustrated in FIG. 7.

Functional Configuration of the Transmission Terminal

The transmission terminal 10 includes a transmitting and receiving unit 11, an operation input receiving unit 12, a login requesting unit 13, an image capturing unit 14, an audio input unit 15a, an audio output unit 15b, an NFC receiving unit 16, a display control unit 17, and a storing and reading unit 19. Each of the units is a function performed by the CPU 101 that executes the transmission terminal control program loaded on the RAM 103 from the flash memory 104. The transmission terminal 10 further includes a storage unit 1000 formed of the RAM 103 and the flash memory 104.

Each Functional Configuration of the Transmission Terminal

The transmitting and receiving unit 11 is formed of the CPU 101 and the network I/F 111. The transmitting and receiving unit 11 transmits and receives various types of data and information to and from other transmission terminals 10 or the apparatuses 30, 50, and 90 via the transmission network 2. The transmitting and receiving unit 11 corresponds to a transmitting unit and a receiving unit of the transmission terminal 10 according to the present invention.

Before starting a video conference with a desired destination terminal, the transmitting and receiving unit 11 starts to receive state information indicating the state of each transmission terminal 10 serving as a candidate of a destination in the video conference from the transmission management apparatus 50.

The state information indicates the transmission state, including whether each transmission terminal 10 is capable of transmission online or whether the transmission terminal 10 is in transmission online, besides whether each transmission terminal 10 is on line or off line.

Furthermore, the state information may indicate various states, such as a state in which the cable 120c comes off the transmission terminal 10, a state in which not an image but audio is output, and a state in which audio is prevented from being output (MUTE), besides the transmission state of each transmission terminal 10.

The operation input receiving unit 12 is formed of the CPU 101, the operation button 108, and the power switch 109. The operation input receiving unit 12 receives various types of input from the user. If the user turns ON the power switch 109, for example, the operation input receiving unit 12 receives the power-ON to turn ON the power of the transmission terminal 10.

The login requesting unit 13 is formed of the CPU 101. The login requesting unit 13 uses reception of power-ON as a trigger to transmit login request information indicating a request for login and a current IP address of the transmission terminal 10 from the transmitting and receiving unit 11 to the transmission management apparatus 50 via the transmission network 2.

If the user turns OFF the power switch 109 from the ON state, the transmitting and receiving unit 11 transmits state information indicating power-OFF to the transmission management apparatus 50. Subsequently, the operation input receiving unit 12 completely turns OFF the power of the transmission terminal 10. This enables the transmission management apparatus 50 to grasp the fact that the transmission terminal 10 is turned OFF from the ON state.

The image capturing unit 14 is formed of the CPU 101, the camera 112, and the image capturing device I/F 113. The image capturing unit 14 captures a subject and outputs image data obtained by the capturing to the transmitting and receiving unit 11.

The audio input unit 15a is formed of the CPU 101 and the audio input-output I/F 116. The audio input unit 15a receives an audio signal indicating audio collected by the microphone 114 and converts the received audio signal into audio data.

The audio output unit 15b is formed of the CPU 101 and the audio input-output I/F 116. The audio output unit 15b converts audio data into an audio signal and outputs the converted audio signal to the speaker 115, thereby causing the speaker 115 to output the audio.

The NFC receiving unit 16 is formed of the CPU 101 and the communication I/F 119. If the NFC tag 22 comes closer to a predetermined communication area, and wireless communication with the NFC tag 22 by electromagnetic induction (hereinafter, referred to as NEC communication) are established, the NFC receiving unit 16 receives information stored in the NFC tag 22. In other words, the NFC receiving unit 16 functions as an acquiring unit that acquires information from the NFC tag 22 serving as a device.

The display control unit 17 is formed of the CPU 101 and the display I/F 117 and displays various types of information on the display 120. The display control unit 17 combines pieces of image data having different resolutions received by the transmitting and receiving unit 11. The display control unit 17 transmits the combined image data to the display 120, thereby causing the display 120 to display an image represented by the image data.

Furthermore, the display control unit 17 transmits information of a destination list received by the transmitting and receiving unit 11 from the transmission management apparatus 50 to the display 120. Thus, the display control unit 17 causes the display 120 to display the destination list.

The storing and reading unit 19 is formed of the CPU 101 and the SSD 105. The storing and reading unit 19 stores various types of data in the storage unit 1000 and reads the various types of data stored in the storage unit 1000.

The storage unit 1000 stores therein an identifier for identifying the transmission terminal 10 (hereinafter, referred to as a "terminal ID") and a password, for example. The storage unit 1000 is also used as a receive buffer for image data and audio data received in a video conference held with a destination terminal.

The terminal ID according to the present embodiment indicates information, such as a language, a character, a symbol, and various types of marks, used to uniquely identify the transmission terminal 10. Furthermore, the terminal ID may be information obtained by combining at least two of a language, a character, a symbol, and various types of marks.

Functional Configuration of the NFC Tag

The NFC tag 22 includes a communication unit 221 and a storage unit 222. If the NFC tag 22 comes closer to the NFC receiving unit 16, the communication unit 221 transmits information stored in the storage unit 222 to the NFC receiving unit 16 via NFC. When the distance between the NFC tag 22 and the NFC receiving unit 16 becomes smaller than approximately 10 centimeters, the NFC tag 22 and the NFC receiving unit 16 can perform the NFC, which is non-contact wireless communication, therebetween.

FIG. 8 is a view schematically illustrating a data structure of the storage unit 222. The storage unit 222 is divided into a plurality of blocks. Each block can store therein 32-byte information. A block No. 1 stores therein a unique number, which is information unique to a card. A block No. 2 stores therein a user name, which is information used to identify a user.

The type of the NFC tag 22 may be any one of a passive type, a semi-passive type, and an active type. The NFC tag 22 may be embedded into an IC card, such as an employee ID card, belonging to a user who may possibly participate in a conference as an NFC chip, for example. Alternatively, the NFC tag 22 may be embedded into a smartphone or a mobile phone belonging to the user as an NFC chip, for example.

The storage unit 222 is not necessarily provided in the NFC tag 22 and may be provided in a storage area accessible by the NFC tag 22. In the case where the NFC tag 22 is embedded into another device, such as a smartphone, the storage unit 222 may be provided in a storage area included in the device or a storage area externally attached to the device, such as a subscriber identity module (SIM) card and a secure digital (SD) card.

Instead of the NFC tag 22, a radio frequency identification (RFID) tag using microwaves may be used. In this case, the transmission terminal 10 includes an RFID receiving unit instead of the NFC receiving unit 16. The RFID receiving unit receives information from the RFID tag via wireless communication in a short distance (a few centimeters to a few meters depending on the frequency band) using an electromagnetic field and radio waves.

The NFC tag 22 may be any type of device as long as it can store therein information in a manner acquirable by the transmission terminal 10. The NFC tag 22 may be a mobile external memory, such as a universal serial bus (USB) memory. In this case, the transmission terminal 10 needs to include a USB connector.

Functional Configuration of Transmission Management Apparatus

The transmission management apparatus 50 includes a transmitting and receiving unit 51, a terminal authentication unit 52, a state management unit 53, a terminal extracting unit 54, a terminal state acquiring unit 55, a user name management unit 56 serving as a user identification information management unit, and a storing and reading unit 59. Each of the units is a function performed by the CPU 201 that executes the transmission management program loaded on the RAM 203 from the HD 204. The transmission management apparatus 50 further includes a storage unit 5000 formed of the HD 204.

Terminal Authentication Management Table

The storage unit 5000 stores therein a terminal authentication management database (DB) 5002 including a terminal authentication management table illustrated in FIG. 9. The terminal authentication management table stores therein a password in association with the ID identifying each terminal of all the transmission terminals 10 managed by the transmission management apparatus 50. The terminal authentication management table illustrated in FIG. 9 indicates that the terminal ID of the transmission terminal 10aa is "01aa" and that the password thereof is "aaaa", for example.

Terminal Management Table

The storage unit 5000 further stores therein a terminal management DB 5003 including a terminal management table illustrated in FIG. 10. The terminal management DB 5003 corresponds to a first storage unit.

The terminal management table stores therein, in association with the terminal ID of each transmission terminal 10, the following items: an identification name of the transmission terminal 10 (hereinafter, referred to as a "terminal name"); a transmission state of the transmission terminal 10; a reception date and time when the transmission management apparatus 50 receives login request information for logging in the transmission system 1; an IP address of the transmission terminal 10; and a participant name received by the transmission management apparatus 50 from the transmission terminal 10. The participant name is a user name stored in the NFC tag 22 belonging to a user who uses the transmission terminal 10 serving as the transmission source of the login request information.

The terminal management table illustrated in FIG. 10 indicates that the terminal name of the transmission terminal 10aa with the terminal ID "01aa" is "AA terminal at Tokyo office in Japan", that the transmission state thereof is "on-line (in transmission)", that the reception date and time when login request information is received by the transmission management apparatus 50 is "13:40 p.m. on Nov. 10, 2009", and that the IP address of the transmission terminal 10aa is "1.2.1.3", for example.

Each of the terminal IDs in the terminal management table is uniquely assigned to a transmission terminal 10 when the transmission terminal 10 is registered in the transmission system 1. The terminal name is registered or changed by an administrator of the transmission management apparatus 50. The terminal name may be registered or changed in response to a request issued from the transmission terminal 10 to the transmission management apparatus 50.

A transmission state "on-line (capable of transmission)" indicates the state where the transmission terminal 10 logs in the transmission system 1 but does not participate in a video conference. A transmission state "on-line (in transmission)" indicates the state where the transmission terminal 10 logs in the transmission system 1 and participates in a video conference. A transmission state "off-line" indicates the state where the transmission terminal 10 does not log in the transmission system 1.

Destination List Management Table

The storage unit 5000 further stores therein a destination list management DB 5004 including a destination list management table illustrated in FIG. 11. The destination list management DB 5004 corresponds to a second storage unit.

The destination list management table stores therein the terminal ID of a requestor terminal and the terminal ID of a destination terminal in association with each other. The requestor terminal is a terminal serving as a requestor of a transmission request for requesting start of transmission used in a video conference. The destination terminal is a terminal to which the requestor terminal can transmit the transmission request and is registered as a candidate of the destination.

The destination list management table illustrated in FIG. 11 indicates that the destination terminals to which the transmission terminal 10aa with the terminal ID "01aa" can make a request for start of a video conference are the transmission terminal 10ab with the terminal ID "01ab", the transmission terminal 10ba with the terminal ID "01ba", and the transmission terminal 10db with the terminal ID "01db". The candidate of the destination terminal is added or deleted in response to a request issued from the transmission terminal 10 to the transmission management apparatus 50.

Each Functional Configuration of the Transmission Management Apparatus

The transmitting and receiving unit 51 is formed of the CPU 201 and the network I/F 209. The transmitting and receiving unit 51 transmits and receives various types of data and information to and from other transmission terminals 10 or the apparatuses 30 and 90 via the transmission network 2.

The terminal authentication unit 52 is formed of the CPU 201. The terminal authentication unit 52 uses a terminal ID and a password included in login request information received by the transmitting and receiving unit 51 as a search key to search the terminal authentication management DB 5002 in the storage unit 5000. The terminal authentication unit 52 determines whether the same terminal ID and the same password are stored in the terminal authentication management DB 5002, thereby performing terminal authentication.

The state management unit 53 is formed of the CPU 201. To manage the transmission state of a requestor terminal that makes a login request, the state management unit 53 stores and manages the transmission state, the reception date and time when the transmission management apparatus 50 receives the login request information, and the IP address in association with the terminal ID of the requestor terminal in the terminal management DB 5003 (refer to FIG. 10).

If the user turns OFF the power switch 109 of the transmission terminal 10 from the ON state, the state management unit 53 changes the transmission state of the transmission terminal 10 in the terminal management DB 5003 (refer to FIG. 10) from on-line to off-line based on the state information indicating power-OFF transmitted from the transmission terminal 10.

The user name management unit 56 registers and deletes a participant name in the terminal management DB 5003 (refer to FIG. 10) based on the user name transmitted from the transmission terminal 10.

The terminal extracting unit 54 is formed of the CPU 201. The terminal extracting unit 54 uses the terminal ID of the requestor terminal that makes the login request as a search key to search the destination list management DB 5004 (refer to FIG. 11). The terminal extracting unit 54 extracts the terminal ID of a candidate of the destination terminal corresponding to the requestor terminal.

Furthermore, the terminal extracting unit 54 uses the terminal ID of the requestor terminal that makes the login request as a search key to search the destination list management DB 5004 (refer to FIG. 11). The terminal extracting unit 54 extracts the terminal ID of another requestor terminal that registers the terminal ID of the requestor terminal as a candidate of the destination terminal.

The terminal state acquiring unit 55 is formed of the CPU 201. The terminal state acquiring unit 55 uses the terminal ID of the candidate of the destination terminal extracted by the terminal extracting unit 54 as a search key to search the terminal management DB 5003 (refer to FIG. 10). The terminal state acquiring unit 55 reads the transmission state for each searched terminal ID.

This enables the terminal state acquiring unit 55 to acquire the transmission state of the candidate of the destination terminal corresponding to the requestor terminal that makes the login request. Furthermore, the terminal state acquiring unit 55 uses the terminal ID extracted by the terminal extracting unit 54 as a search key to search the terminal management DB 5003. The terminal state acquiring unit 55 can also acquire the transmission state of the requestor terminal that makes the login request.

The storing and reading unit 59 is formed of the CPU 201 and the HDD 205. The storing and reading unit 59 stores various types of data in the storage unit 5000 and reads the various types of data stored in the storage unit 5000.

Processing or Operation of the Embodiment

Figure 12:
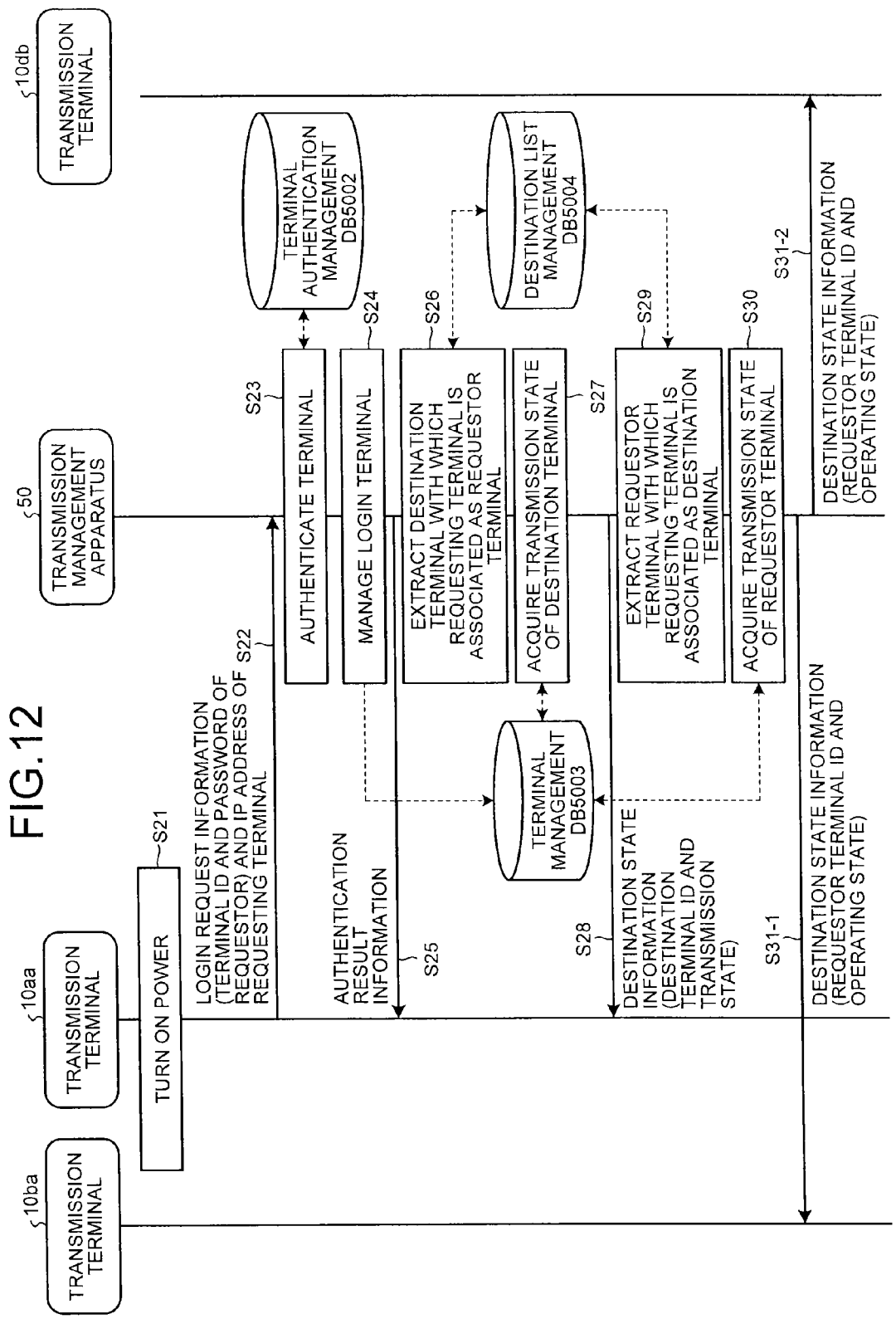
FIG. 12 is a sequence diagram of a preparatory stage operation of the transmission system.

The following describes an operation of the transmission system 1 according to the present embodiment. FIG. 12 is a sequence diagram of a preparatory stage operation performed until the transmission terminal 10 comes into a preparatory state to participate in a video conference. FIG. 12 illustrates an example in which the transmission terminal 10aa comes into the preparatory state. In the preparatory stage operation, various types of information are transmitted and received by the management information session sei (refer to FIG. 2).

If the user of the transmission terminal 10aa turns ON the power switch 109 of the transmission terminal 10aa, the operation input receiving unit 12 receives the power-ON to turn ON the power (Step S21). The login requesting unit 13 uses the reception of power-ON as a trigger to transmit login request information indicating a login request from the transmitting and receiving unit 11 of the transmission terminal 10aa to the transmission management apparatus 50 via the transmission network 2 (Step S22).

The login request information includes the terminal ID and the password for identifying the transmission terminal 10aa that requests the login. The terminal ID and the password are read from the storage unit 1000 by the storing and reading unit 19.

If the login request information transmitted from the transmission terminal 10aa is received by the transmission management apparatus 50, the transmission management apparatus 50 can grasp the IP address of the transmission terminal 10ab serving as the transmission source.

The terminal authentication unit 52 of the transmission management apparatus 50 uses the terminal ID and the password included in the login request information received by the transmitting and receiving unit 51 as a search key to search the terminal authentication management DB 5002 (refer to FIG. 9) of the storage unit 5000. The terminal authentication unit 52 determines whether the same terminal ID and the same password as those of the search key are stored in the terminal authentication management DB 5002, thereby performing terminal authentication (Step S23).

If the terminal authentication unit 52 determines that the same terminal ID and the same password as those of the search key are not stored, that is, if the terminal authentication unit 52 determines that the login request is not made by a duly authorized transmission terminal 10, the transmitting and receiving unit 51 transmits authentication result information indicating the authentication result obtained by the terminal authentication unit 52 to the transmission terminal 10aa that makes the login request via the transmission network 2. Thus, the preparatory stage operation is terminated.

By contrast, if the terminal authentication unit 52 determines that the same terminal ID and the same password as those of the search key are stored, that is, if the terminal authentication unit 52 determines that the login request is made by a duly authorized transmission terminal 10, the state management unit 53 stores the terminal ID of the transmission terminal 10aa, the transmission state, the reception date and time when the login request information is received, and the IP address of the transmission terminal 10aa in the terminal management DB 5003 (refer to FIG. 10) in association with one another (Step S24).

Thus, as illustrated in FIG. 10, the terminal management table stores therein the terminal ID "01aa", the transmission state "on-line (in transmission)", the reception date and time "2009.11.10.13:40", and the IP address of the transmission terminal 10aa "1.2.1.3" in association with one another.

The transmitting and receiving unit 51 of the transmission management apparatus 50 then transmits the authentication result information indicating the authentication result obtained by the terminal authentication unit 52 to the transmission terminal 10aa that makes the login request via the transmission network 2 (Step S25).

The terminal extracting unit 54 of the transmission management apparatus 50 uses the terminal ID "01aa" of the transmission terminal 10aa that makes the login request as a search key to search the destination list management DB 5004 (refer to FIG. 11). The terminal extracting unit 54 extracts the terminal ID of a candidate of the destination terminal corresponding to the transmission terminal 10aa (Step S26).

In the present embodiment, the terminal extracting unit 54 extracts the terminal IDs "01ab", "01ba", and "01db" of the transmission terminals 10ab, 10ba, and 10db, respectively, serving as the candidates of the destination terminal corresponding to the terminal ID "01aa" of the transmission terminal 10aa.

The terminal state acquiring unit 55 of the transmission management apparatus 50 uses the terminal IDs "01ab", "01*ba*", and "01*db*" of the candidates of the destination terminal extracted by the terminal extracting unit 54 as a search key to search the terminal management DB 5003 (refer to FIG. 10). The terminal state acquiring unit 55 reads the transmission states "off-line", "on-line (capable of transmission)", and "on-line (in transmission)" of the respective terminal IDs extracted by the terminal extracting unit 54. Thus, the terminal state acquiring unit 55 acquires the transmission states of the transmission terminals 10*ab*, 10*ba*, and 10*db* (Step S27).

The transmitting and receiving unit 51 of the transmission management apparatus 50 transmits destination state information to the transmission terminal 10*aa* via the transmission network (Step S28). The destination state information includes the terminal IDs "01*ab*", "01*ba*", and "01*db*" serving as the search key used at Step S27 and the transmission states "off-line", "on-line (capable of transmission)", and "on-line (in transmission)" of the transmission terminals 10*ab*, 10*ba*, and 10*db* corresponding thereto, respectively.

This enables the transmission terminal 10*aa* to grasp the current transmission states "off-line", "on-line (capable of transmission)", and "on-line (in transmission)" of the transmission terminals 10*ab*, 10*ba*, and 10*db*, respectively, serving as the candidates of the destination terminal.

Furthermore, the terminal extracting unit 54 of the transmission management apparatus 50 uses the terminal ID "01*aa*" of the transmission terminal 10*aa* that makes the login request as a search key to search the destination list management DB 5004 (refer to FIG. 11). The terminal extracting unit 54 extracts a terminal ID of another transmission terminal that registers the terminal ID "01*aa*" of the transmission terminal 10*aa* as a candidate of the destination terminal (Step S29). In the destination list management table illustrated in FIG. 11, for example, the terminal IDs "01*ab*", "01*ba*", and "01*db*" are extracted.

The state management unit 53 of the transmission management apparatus 50 uses the terminal ID "01*aa*" of the transmission terminal 10*aa* that makes the login request as a search key to search the terminal management DB 5003 (refer to FIG. 10). The state management unit 53 acquires the transmission state "on-line (capable of transmission)" of the transmission terminal 10*aa* that makes the login request (Step S30).

The transmitting and receiving unit 51 of the transmission management apparatus 50 transmits the destination state information including the terminal ID "01*aa*" of the transmission terminal 10*aa* and the transmission state "on-line (in transmission)" acquired at Step S30 to the transmission terminals 10*ba* and 10*db* whose transmission state is "on-line" in the terminal management DB 5003 (refer to FIG. 10) among the transmission terminals 10*ab*, 10*ba*, and 10*db* identified by the terminal IDs "01*ab*", "01*ba*", and "01*db*", respectively, extracted at Step S29 (Steps S31-1 and S31-2).

To transmit the destination list information to the transmission terminals 10*ba* and 10*db*, the transmitting and receiving unit 51 refers to the IP addresses of the transmission terminals stored in the terminal management table illustrated in FIG. 10 based on the terminal IDs "01*ba*" and "01*db*".

This makes it possible to transmit the terminal ID "01*aa*" and the transmission state "on-line (in transmission)" of the transmission terminal 10*aa* that makes the login request to the transmission terminals 10*db* and 10*ba* that can specify the transmission terminal 10*aa* that makes the login request as the destination terminal and perform transmission therewith.

After the processing at Step S28 is completed in the preparatory stage operation, the display control unit 17 of the transmission terminal 10*aa* causes the display 120 to highlight the information of the terminal that is participating in the video conference, that is, the information of the transmission terminal 10*db* whose transmission state is "on-line (in transmission)" or "on-line (capable of transmission)" among the information of the destination list displayed on the display 120, for example. This enables the user to find the transmission terminal 10 that is participating in the video conference or the transmission terminal 10 that can participate in the video conference.

Figure 13:
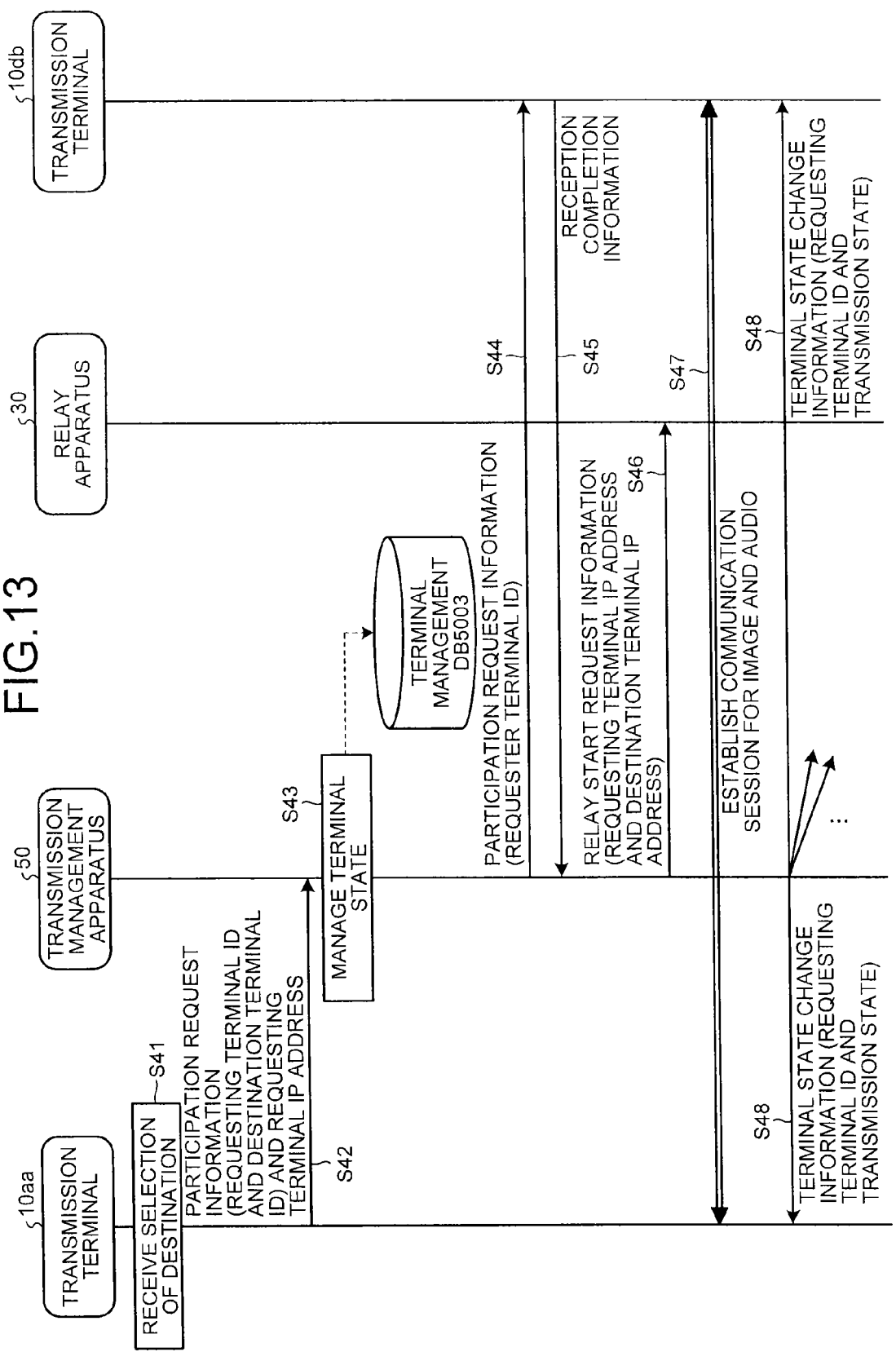
FIG. 13 is a sequence diagram of a conference participation operation of the transmission system.

FIG. 13 is a sequence diagram of a conference participation operation performed until the transmission terminal 10 comes into a participation state in a video conference. FIG. 13 illustrates an example in which the transmission terminal 10*aa* comes into the participation state. In the conference participation operation, various types of information are transmitted and received by the management information session sei (refer to FIG. 2).

If the user presses the operation button 108 to select participation in a video conference, the operation input receiving unit 12 receives a request for participating in the video conference with the transmission terminal 10*db* (Step S41).

In response to the request, the transmitting and receiving unit 11 of the transmission terminal 10*aa* transmits participation request information including the terminal ID "01*aa*" of the transmission terminal 10*aa* and the terminal ID "01*db*" of the transmission terminal 10*db* and indicating participation in the video conference to the transmission management apparatus 50 (Step S42).

This enables the transmitting and receiving unit 51 of the transmission management apparatus 50 to receive the participation request information and check the IP address "1.2.1.3" of the transmission terminal 10*aa* serving as the transmission source.

The state management unit 53 of the transmission management apparatus 50 uses the terminal ID "01*aa*" of the transmission terminal 10*aa* included in the participation request information as a search key to search the terminal management DB 5003 (refer to FIG. 10). The state management unit 53 sets the transmission state of the transmission terminal 10*aa* that makes the participation request to "on-line (in transmission)" (Step S43).

The transmitting and receiving unit 51 of the transmission management apparatus 50 transmits the participation request information including the terminal ID "01*aa*" of the transmission terminal 10*aa* to the transmission terminal 10*db* via the transmission network 2 (Step S44). This enables the transmission terminal 10*db* to grasp which transmission terminal 10 requests to participate in the video conference.

In the terminal management DB 5003 illustrated in FIG. 10, the transmission state of the transmission terminal 10*cb* is also "on-line (in transmission)". The transmitting and receiving unit 51 of the transmission management apparatus 50 transmits the participation request information including the terminal ID "01*aa*" of the transmission terminal 10*aa* to the transmission terminal 10*cb* via the transmission network 2, which is not explained.

The transmission terminal 10*db* causes the transmitting and receiving unit 11 to transmit reception completion information indicating that reception of the participation request information is completed to the transmission management apparatus 50 via the transmission network 2 (Step S45).

The transmitting and receiving unit 51 of the transmission management apparatus 50 transmits relay start request information for requesting start of a relay to the relay apparatus 30 via the transmission network 2 (Step S46). The relay start request information includes the IP address "1.2.1.3" of the transmission terminal 10*aa* and the IP address "1.3.2.4" of the transmission terminal 10*db*.

This causes the relay apparatus 30 to establish sessions used to transmit three pieces of image data of low-resolution image data, medium-resolution image data, and high-resolution image data, and audio data between the transmission terminals 10*aa* and 10*db* (Step S47). Thus, the transmission terminal 10*aa* can participate in the video conference with the transmission terminal 10*db*.

The transmitting and receiving unit 51 of the transmission management apparatus 50 casts terminal state change information including the terminal ID "01*aa*" and the transmission state "on-line (in transmission)" of the transmission terminal 10*aa* to the transmission terminals 10 registered in the terminal management DB 5003 (refer to FIG. 10) (Step S48). This enables the transmission terminals that receive the terminal state change information to store and display the transmission state of the transmission terminal 10*aa* with the terminal ID "01*aa*" as needed.

Figure 14:
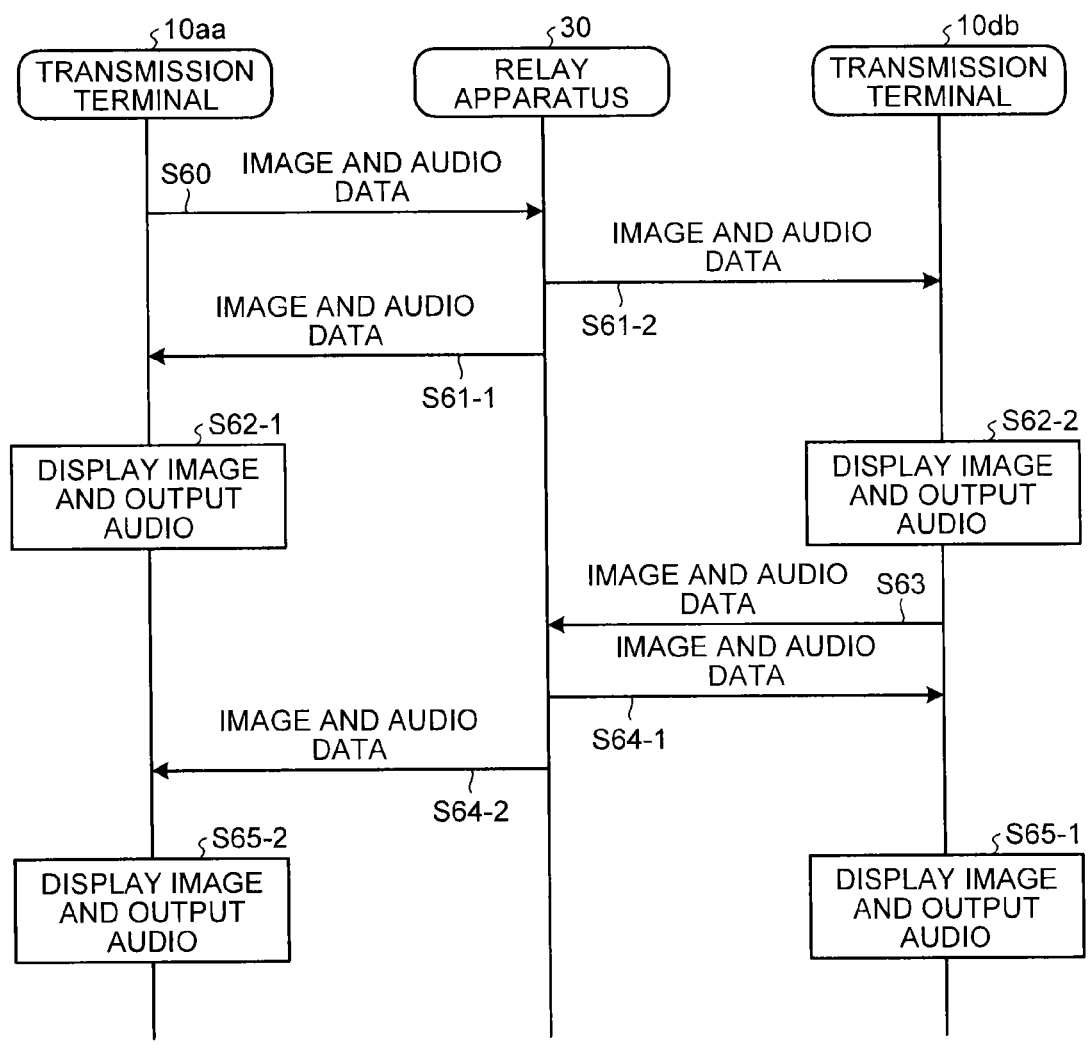
FIG. 14 is a sequence diagram of a data transmission operation of the transmission system.

FIG. 14 is a sequence diagram of a data transmission operation between the transmission terminals 10. In the data transmission operation illustrated in FIG. 14, image data and audio data are transmitted and received by the image and audio data session sed (refer to FIG. 2).

If the sessions between the transmission terminals 10*aa* and 10*db* are established as described with reference to FIG. 13, the transmission terminal 10*aa* transmits image data obtained by capturing performed by the image capturing unit 14 and audio data obtained by converting an audio signal received by the audio input unit 15*a* to the relay apparatus 30 via the transmitting and receiving unit 11 (Step S60).

The relay apparatus 30 receives the image data and the audio data from the transmission terminal 10*aa*. The relay apparatus 30 then transmits the received image data and the received audio data to the transmission terminals 10*aa* and 10*db* that are participating in the video conference (Steps S61-1 and S61-2).

The transmission terminals 10*aa* and 10*db* receive the image data and the audio data from the relay apparatus 30. The transmission terminals 10*aa* and 10*db* each cause the display control unit 17 to display an image represented by the received image data on the display 120 and cause the audio output unit 15*b* to output audio represented by the received audio data from the speaker 115 (Steps S62-1 and S62-2).

The transmission terminal 10*db* transmits image data obtained by capturing performed by the image capturing unit 14 and audio data obtained by converting an audio signal received by the audio input unit 15*a* to the relay apparatus 30 via the transmitting and receiving unit 11 (Step S63).

The relay apparatus 30 receives the image data and the audio data from the transmission terminal 10*db*. The relay apparatus 30 then transmits the received image data and the received audio data to the transmission terminals 10*aa* and 10*db* that are participating in the video conference (Steps S64-1 and S64-2).

The transmission terminals 10*aa* and 10*db* receive the image data and the audio data from the relay apparatus 30. The transmission terminals 10*aa* and 10*db* each cause the display control unit 17 to display an image represented by the received image data on the display 120 and cause the audio output unit 15*b* to output audio represented by the received audio data from the speaker 115 (Steps S65-1 and S65-2).

Thus, the transmission terminals 10*aa* and 10*db* can hold the video conference via the relay apparatus 30. To facilitate understanding of the present invention, two transmission terminals 10*aa* and 10*db* are participating in the video conference in FIG. 13. Even if three or more transmission terminals 10 are participating in the video conference, image data and audio data are transmitted in the same manner as in the data transmission operation illustrated in FIG. 14.

Figure 15:
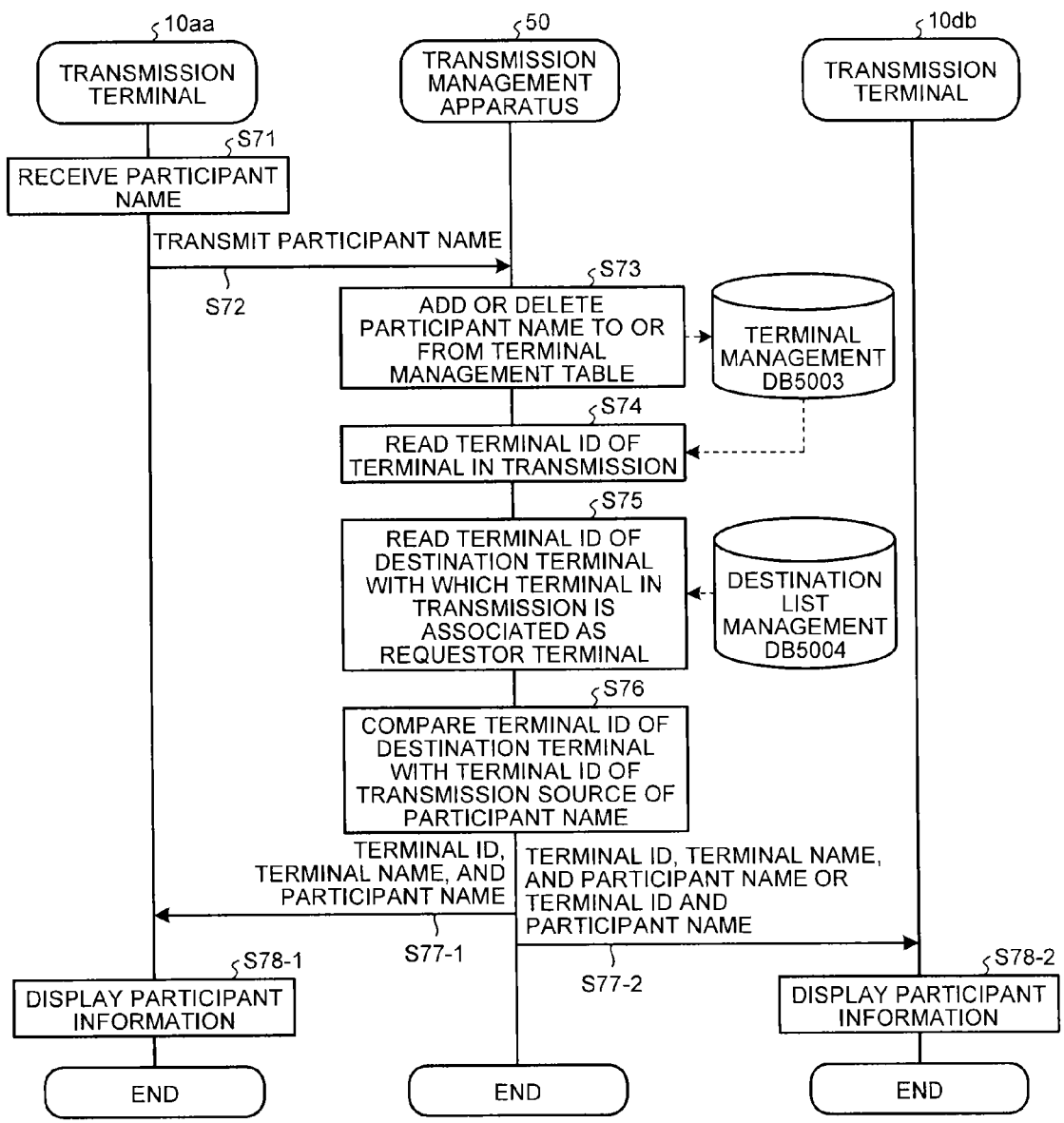
FIG. 15 is a sequence diagram of an operation for displaying information of a participant in a video conference.

FIG. 15 is a sequence diagram of an operation for displaying information of a participant in the video conference on the display 120 of the transmission terminal 10 after the data transmission operation between the transmission terminals 10 is started. In the display operation illustrated in FIG. 15, the user who uses the transmission terminal 10*aa* participates in the video conference, and the information about the user is displayed on the display 120*db* of the transmission terminal 10*db* and on the display 120*aa* of the transmission terminal 10*aa* that are participating in the video conference, for example.

An assumption is made that the user who participates in the video conference brings his/her NFC tag 22 closer to the transmission terminal 10*aa* when joining and leaving the video conference.

If the user brings his/her NFC tag 22 closer to the NFC receiving unit 16, wireless communication is established between the NFC tag 22 and the NFC receiving unit 16. The NFC receiving unit 16 reads the user name, that is, the participant name stored in the NFC tag 22 (Step S71). Specifically, the NFC receiving unit 16 reads a user name "Jiro Kanagawa" from the block No. 2 of the storage unit 222 illustrated in FIG. 8. The transmitting and receiving unit 11 transmits the read participant name to the transmission management apparatus 50 (Step S72).

If the transmitting and receiving unit 51 receives the participant name in the transmission management apparatus 50, the terminal extracting unit 54 uses the IP address of the transmission source of the participant name as a search key to search the terminal management DB 5003 (refer to FIG. 10). The terminal extracting unit 54 reads the terminal ID and the terminal name of the transmission terminal serving as the transmission source. In this example, the terminal extracting unit 54 extracts the terminal ID "01*aa*" and the terminal name "AA terminal at Tokyo office in Japan". The user name management unit 56 updates the terminal management DB 5003 (refer to FIG. 10) based on the participant name received by the transmitting and receiving unit 51 (Step S73).

Figure 16:
FIG. 16 is a conceptual view of the updated terminal management table.

Specifically, if the received participant name is not stored in the terminal management DB 5003 (refer to FIG. 10), the user name management unit 56 writes the received participant name in the terminal management DB 5003 in association with the terminal ID of the transmission terminal 10 serving as the transmission source of the participant name. If the received participant name is "Jiro Kanagawa", for example, the user name management unit 56 adds the participant name "Jiro Kanagawa" in association with the terminal ID "01*aa*" in the terminal management table of the terminal management DB 5003 illustrated in FIG. 10. FIG. 16 is a view of the terminal management DB in which "Jiro Kanagawa" is added to the participant name in association with the terminal ID "01*aa*". If a plurality of participants use one terminal 10*aa* in this manner, the respective participant names are written in the terminal management DB 5003. By contrast, if the received participant name is stored in the terminal management DB at Step S73, the user name management unit 56 deletes the received participant name from the terminal management DB 5003. If the received participant name is "Taro Tokyo", for example, the user name management unit 56 deletes the participant name "Taro Tokyo" stored in association with the terminal ID "01*aa*" in the terminal management table of the terminal management DB 5003 illustrated in FIG. 10. The fact that the received participant name is stored in the terminal management DB 5003 means that the participant who has already participated in the video conference brings the NFC tag 22 closer to the NFC receiving unit 16 again to leave the video conference.

The terminal state acquiring unit 55 of the transmission management apparatus 50 searches the terminal management DB 5003 (refer to FIG. 10) to read all the terminal IDs associated with the transmission state "on-line (in transmission)" (Step S74). In the terminal management DB 5003 illustrated in FIG. 10, the terminal IDs "01aa", "01cb", and "01db" are read.

The terminal extracting unit 54 refers to the column of the requester terminal ID in the destination list management DB 5004 for target terminal IDs other than the terminal ID corresponding to the terminal ID of the transmission source of the participant name among the terminal IDs read at Step S74. The terminal extracting unit 54 reads the terminal IDs of all the destination terminals that specify the target terminal IDs as the requestor terminal (Step S75). Specifically, the terminal extracting unit 54 excludes the terminal ID "01aa" from the terminal IDs "01aa", "01cb", and "01db" read at Step S74. The terminal extracting unit 54 then reads the destination terminal IDs associated with the requestor terminal IDs "01cb" and "01db" in the destination list management DB 5004.

The transmitting and receiving unit 51 compares the terminal ID of the transmission source of the participant name with the terminal IDs of the destination terminals read at Step S75 (Step S76). Based on the comparison result, the transmitting and receiving unit 51 transmits participant information including the participant name and that fact of addition of the new participant to the transmission terminals in transmission and the transmission terminal serving as the transmission source (Steps S77-1 and S77-2).

Specifically, if the terminal 10 serving as the transmission source of the participant name is registered as a destination terminal with which the transmission terminal 10 to which the participant name is to be transmitted is associated as the requestor terminal in the destination list management DB 5004 (refer to FIG. 11), the transmitting and receiving unit 51 transmits the participant information including the terminal ID, the terminal name, and the participant name of the terminal 10 serving as the transmission source of the participant name to the transmission terminal.

By contrast, if the terminal 10 serving as the transmission source of the participant name is not registered as a destination terminal with which the transmission terminal 10 to which the participant name is to be transmitted is associated as the requestor terminal in the destination list management DB 5004 (refer to FIG. 11), the transmitting and receiving unit 51 does not transmit the terminal name of the terminal 10 serving as the transmission source of the participant name. The transmitting and receiving unit 51 transmits the participant information including the terminal ID and the participant name of the terminal 10 serving as the transmission source of the participant name to the transmission terminal. The transmitting and receiving unit 51 transmits the participant information including the terminal ID, the terminal name, and the participant name to the terminal 10 serving as the transmission source of the participant name.

The destination terminals of the target terminal ID "01cd" extracted at Step S75 does not include "01aa". The transmitting and receiving unit 11 transmits the participant information including the terminal ID and the participant name of the transmission source of the participant name to the transmission terminal 10cd. By contrast, the destination terminals of the target terminal ID "01db" extracted at Step S75 includes "01aa". The transmitting and receiving unit 51 transmits the participant information including the terminal ID, the terminal name, and the participant name of the transmission source of the participant name to the transmission terminal 10db. The transmission terminals that receive the participant information each display the participant information on the display 120 (Steps S78-1 and S78-2).

Thus, the processing is terminated.

The transmission terminal 10 that receives the participant information including the terminal ID, the terminal name, the participant name, and the fact of addition of the new participant displays the participant information indicating "01aa, AA terminal at Tokyo office in Japan, Jiro Kanagawa joins the conference" on the display 120, for example. By contrast, the transmission terminal 10 that receives the participant information including the terminal ID, the participant name, and the fact of addition of the new participant displays the participant information indicating "01aa, Jiro Kanagawa joins the conference" on the display 120, for example.

If the participant name corresponding to the received participant name is deleted from the terminal management DB 5003 at Step S73, that is, if the participant leaves the conference, the same processing as that at Steps S74 to S76 is performed. At Steps S77-1 and S77-2, the transmitting and receiving unit 51 transmits leaver information including the terminal ID, the terminal name, a leaver name, and the fact of leaving of the leaver or leaver information including the terminal ID, the leaver name, and the fact of leaving of the leaver to the transmission terminal.

The transmission terminal 10 that receives the leaver information including the terminal ID, the terminal name, the leaver name, and the fact of leaving of the leaver displays the leaver information indicating "01aa, AA terminal at Tokyo office in Japan, Taro Tokyo left the conference" on the display 120, for example. By contrast, the transmission terminal 10 that receives the leaver information including the terminal ID, the leaver name, and the fact of leaving of the leaver displays the leaver information indicating "01aa, Taro Tokyo left the conference" on the display 120, for example.

As described above, the display 120 of the transmission terminal 10 displays the terminal ID and the participant name. If the terminal identified by the terminal ID is a destination terminal, the display 120 further displays the terminal name corresponding to the terminal ID.

In the transmission system 1 according to the present embodiment, the transmission management apparatus 50 uses reception of the participant name from the transmission terminal 10 as a trigger to update the terminal management DB 5003 at this timing. In addition, the transmission management apparatus 50 can transmit the received participant name to a predetermined transmission terminal 10. This enables the transmission system 1 to notify the conference participants of information relating to a new participant and a leaver as appropriate during the conference without interrupting the proceedings of the conference.

The following describes image display of the transmission terminal 10. In the present embodiment, the display control unit 17 has two display modes of a full-screen display mode and an information display mode. The display modes are switched in response to an operation of the operation button 108 performed by the user, for example.

Figure 17:
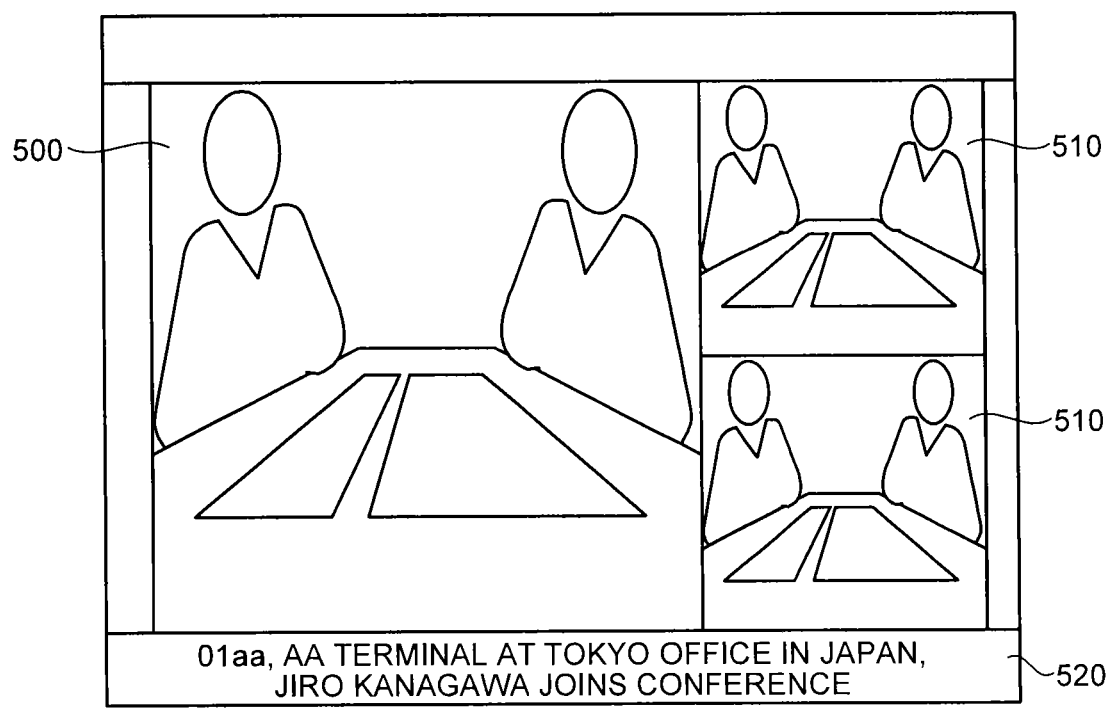
FIG. 17 is a conceptual view of a display screen in a full-screen display mode.

As illustrated in FIG. 17, the display control unit 17 of the transmission terminal 10 causes the display 120 to display all the images transmitted from the transmission terminals 10 that are participating in the video conference in the full-screen display mode.

The display screen illustrated in FIG. 17 includes a first image area 500 having a relatively large area and a plurality of second image areas 510 having a relatively small area. The second image areas 510, for example, display images represented by image data transmitted from the respective transmission terminals 10 that are participating in the video conference. The first image area 500, for example, displays an image represented by image data of a major transmission terminal 10 among the transmission terminals 10 that are participating in the video conference.

The display control unit 17, for example, identifies a transmission terminal serving as a transmission source of audio data representing speech in received audio data as the major terminal among the transmission terminals 10 that are participating in the video conference. The audio data representing speech is audio data determined to have a speech section by detection of an audio section carried out on the received audio data. The detection of an audio section can be carried out using a publicly known technology (refer to Niimi, "Speech Recognition", Kyoritsu Shuppan Co., Ltd., pp. 68-72, 1979, for example).

In the full-screen display mode of the transmission terminal 10, if the transmitting and receiving unit 11 receives participant information and leaver information by the operation described with reference to FIG. 15, the display control unit 17 displays these pieces of information on a participant information display area 520.

After displaying the participant information and the leaver information for a certain period of time, such as five seconds, the display control unit 17 erases these pieces of information from the display 120. Instead of displaying the participant information on the participant information display area 520 of the display screen, a pop-up screen displaying the participant information may be displayed in a superimposed manner for a certain period of time, for example. The pop-up screen may be displayed in a manner superimposed on an area that displays the image data transmitted from the transmission terminal 10 used by the participant.

Figure 18:
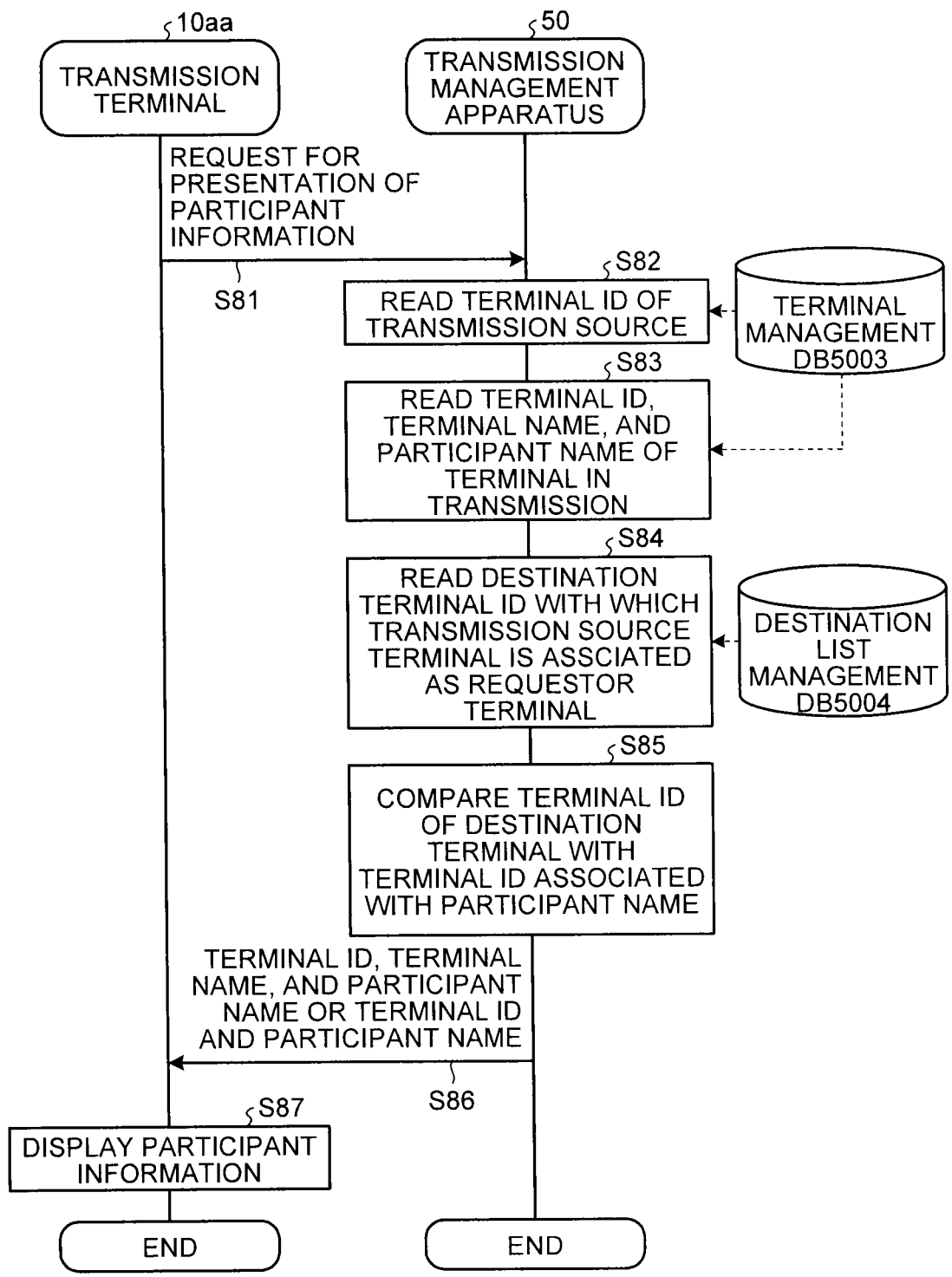
FIG. 18 is a sequence diagram of a display switching operation.

The following describes an operation for switching display of the display 120 from the full-screen display mode to the information display mode. FIG. 18 is a sequence diagram of an operation for switching display to the information display mode. In the display switching operation illustrated in FIG. 18, various types of information are transmitted and received by the management information session sei. The following describes the case where display of the display 120aa of the transmission terminal 10aa is switched.

The transmission terminal 10aa transmits a request for presentation of participant information serving as information relating to the transmission terminal 10 that is participating in the video conference to the transmission management apparatus 50 (Step S81). If the transmitting and receiving unit 51 of the transmission management apparatus 50 receives the presentation request, the terminal extracting unit 54 uses the IP address of the terminal serving as the transmission source of the presentation request as a search key to search the terminal management DB 5003 (refer to FIG. 10) of the storage unit 5000. The terminal extracting unit 54 reads the terminal ID of the terminal serving as the transmission source of the presentation request (Step S82).

Based on results of a search of the terminal management DB 5003 made by the terminal state acquiring unit 55, the terminal extracting unit 54 reads the terminal ID and the terminal name whose transmission state is "on-line (in transmission)" and the participant name thereof (Step S83). In the terminal management DB 5003 illustrated in FIG. 10, "01aa", "01cb", and "01db" are read as the terminal ID of the terminal in transmission. In addition, the participant names "Taro Tokyo", "Mike Smith", and "Raquel Rodrriguez" are read.

The terminal extracting unit 54 uses the terminal ID of the terminal serving as the transmission source of the presentation request ("01aa" in this example) as a search key to refer to the column of the requester terminal ID in the destination list management DB 5004. The terminal extracting unit 54 reads the terminal IDs of the destination terminals that specify the terminal of the transmission source as the requestor terminal (Step S84). Specifically, the terminal extracting unit 54 reads the terminal IDs "01ab", "01ba", and "01db" for the terminal ID "01aa" of the transmission source terminal at Step S84.

The terminal extracting unit 54 functions as a first extracting unit that extracts the participant name and the terminal ID, which is user identification information, from the terminal management DB 5003 serving as the first storage unit. In addition, the terminal extracting unit 54 functions as a second extracting unit that extracts the terminal ID of the destination terminal with which the transmission terminal of the transmission source is associated as the requestor terminal from the destination list management DB 5004 serving as the second storage unit.

The transmitting and receiving unit 51 compares the terminal IDs in transmission read at Step S84 with the terminal IDs of the destination terminals (Step S85). Based on the comparison result, the transmitting and receiving unit 51 transmits participant information including the terminal ID, the terminal name, and the participant name of the transmission terminal in transmission or participant information not including the terminal name but including the terminal ID and the participant name to the transmission terminal 10aa serving as the requestor of the presentation request (Step S86).

Specifically, if the transmission terminals in transmission are registered as destination terminals of the transmission terminal 10 serving as the transmission source, the transmitting and receiving unit 51 transmits the participant information including the terminal ID, the terminal name, and the participant name of the terminals in transmission. By contrast, if the transmission terminals in transmission are not registered as destination terminals of the transmission terminal 10 serving as the transmission source, the transmitting and receiving unit 51 transmits the participant information not including the terminal name but including the terminal ID and the participant name of the terminals in transmission. The participant information is transmitted to the respective transmission terminals.

In terms of the transmission source terminal 10aa, the transmitting and receiving unit 51 transmits the participant information including the terminal ID, the terminal name, and the participant name to the transmission terminal 10aa and the transmission terminal 10db. By contrast, the transmitting and receiving unit 51 transmits the participant information not including the terminal name but including the terminal ID and the participant name to the transmission terminal 10cb.

If the transmission terminal 10aa receives the participant information from the transmission management apparatus 50 (Step S86), the transmission terminal 10aa displays the received participant information on the display 120aa (Step S87). Thus, the processing is terminated.

Figure 19:
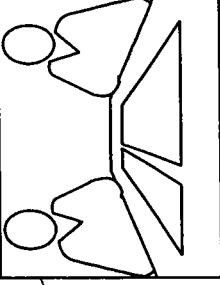
FIG. 19 is a conceptual view of a display screen in an information display mode.

FIG. 19 is a schematic of a display example of the participant information in the information display mode displayed on the display 120aa by the processing of FIG. 18. The display screen in the information display mode includes an image display area 530 that displays an image and a participant information display area 540 that displays participant information. The participant information display area 540 displays a list of the participant information of the transmission terminals 10 that are participating in the video conference.

The terminal IDs and the participant names of the transmission terminals 10 that are participating in the video conference are displayed as a list in association with each other. With this configuration, switching the screen display to the information display mode at a desired timing enables the participant to grasp the terminal IDs and the participant names of the terminals 10 that are participating in the video conference. Because the terminal names are further displayed for the destination terminals, the participant can also grasp the terminal names of the destination terminals.

In the display screen illustrated in FIG. 19, because the transmission terminal 10*db* is registered as a candidate of the destination terminal of the transmission terminal 10*aa* in the destination list management DB 5004, the terminal name thereof is displayed. By contrast, because the transmission terminal 10*cb* is not registered as a candidate of the destination terminal of the transmission terminal 10*aa* in the destination list management DB 5004, the terminal name thereof is not displayed. The terminal name of the transmission terminal 10*aa* is also displayed because it is the display screen of the terminal 10*aa* itself.

The image display area 530 displays an image represented by image data of a major transmission terminal among the transmission terminals 10 that are participating in the video conference. The display control unit 17, for example, identifies a transmission terminal serving as a transmission source of audio data representing speech among received audio data as the major transmission terminal among the transmission terminals 10 that are participating in the video conference. Alternatively, when the operation input receiving unit 12 receives selection of one transmission terminal from the transmission terminals 10 that are participating in the video conference in response to an operation of the operation button 108 performed by the user, the display control unit 17 may identify the selected transmission terminal as the major transmission terminal.

While the present invention has been described with reference to the embodiment, various changes and modifications can be made in the embodiment.

Major Advantageous Effects of the Present Embodiment

As described above, the transmission system 1 according to the present embodiment reflects the information of the transmission terminals 10 that are participating in the video conference on the transmission management apparatus 50. This enables the users (conference participants) of the respective transmission terminals 10 to grasp who is participating in the video conference from which transmission terminal 10 regardless of the number of transmission terminals 10 that are participating in the video conference.

Thus, the transmission system 1 can notify the users of the destination of the video conference without causing the users to ask about the destination in conversation, thereby reducing the conference time. Furthermore, the transmission system 1 does not display the terminal name of the transmission terminal that is not registered as the destination. Thus, the transmission system 1 can notify that a stranger is participating in the video conference. This enables the users to conduct the conference while being careful about the contents of the conversation.

The transmission system 1 displays the image data of the major transmission terminal even when the display 120 displays the terminal information in the information display mode. Thus, the transmission system 1 enables the users to grasp the state of the point that takes the lead in the conference.

Second Embodiment

A transmission system 1 according to a second embodiment will now be described. In the transmission system 1 according to the first embodiment, the participant of the video conference brings the NFC tag 22 closer to the NFC receiving unit 16 when joining and leaving the video conference. The transmission management apparatus 50 receives the participant name stored in the NFC tag 22, thereby detecting addition of the new participant and leaving of the participant.

In the transmission system 1 according to the second embodiment, a participant of a video conference keeps an NFC tag 22 within a communication range in which the NFC tag 22 is wirelessly communicable with an NFC receiving unit 16 while participating in the conference. The participant moves the NFC tag 22 out of the communication range of the NFC receiving unit 16 when leaving the conference. A transmission management apparatus 50 detects addition of the new participant and leaving of the participant based on whether the participant name stored in the NFC tag 22 can be received.

Figure 20:
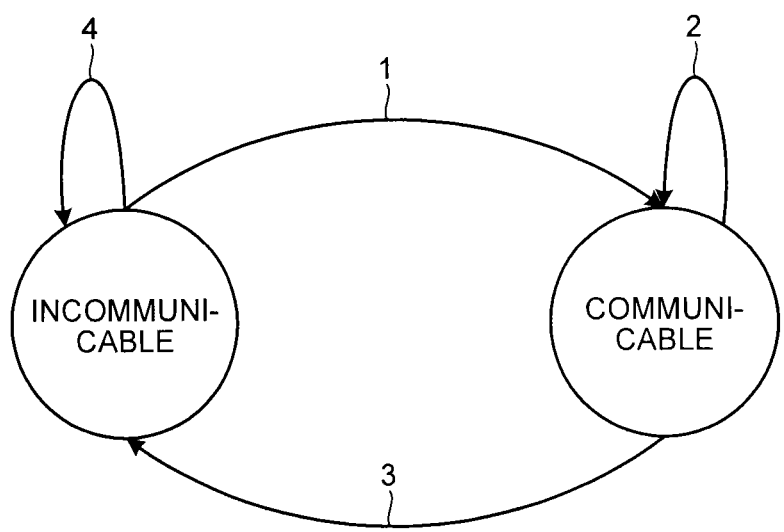
FIG. 20 is a transition diagram of a communication state from when a user joins the conference to when the user leaves the conference.

FIG. 20 is a transition diagram of a communication state of the NFC receiving unit 16 from when a user who has the NFC tag 22 joins the conference to when the user leaves the conference. While the NFC tag 22 belonging to the user is out of the communication range of the NFC receiving unit 16, the communication state remains an incommunicable state (Step 4). If the user brings the NFC tag 22 closer to the NFC receiving unit 16 and causes the NFC tag 22 to come into the communication range of the NFC receiving unit 16, the communication state shifts to a communicable state (Step 1). The shift of the communication state to the communicable state causes a transmission terminal 10 to receive information stored in the NFC tag 22.

Figure 21:
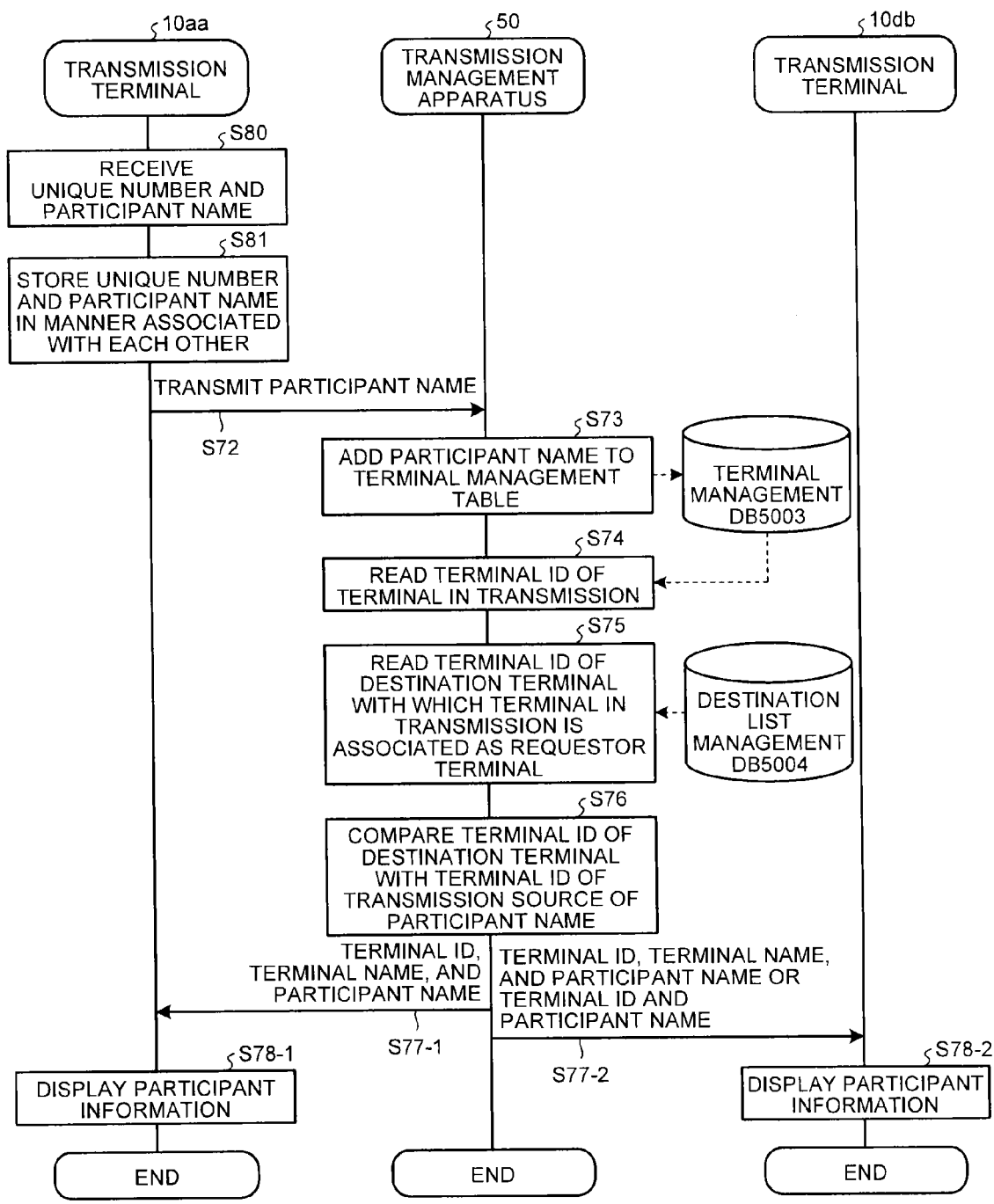
FIG. 21 is a sequence diagram of an operation for displaying participant information.

FIG. 21 is a sequence diagram of an operation for displaying participant information on a display 120 performed using the fact that the NFC receiving unit 16 of the transmission terminal 10 receives the information of the NFC tag 22 as a trigger, that is, using the fact that the communication state shifts to the communicable state (Step 1) as a trigger. The display operation illustrated in FIG. 21 is nearly the same as the display operation of the transmission system 1 according to the first embodiment illustrated in FIG. 15.

In the display operation of the transmission system 1 according to the second embodiment illustrated in FIG. 21, if the NFC tag 22 comes into the communication range, the NFC receiving unit 16 of a transmission terminal 10*aa* receives a unique number besides the user name stored in a storage unit 222 of the NFC tag 22 (Step S80).

Subsequently, the NFC receiving unit 16 writes the received user name and the received unique number in a user name table of a storage unit 1000 in association with each other (Step S81). FIG. 22 is a conceptual view of the user name table of the storage unit 1000. The user name table stores therein user names and unique numbers of users (conference participants) who participant in the video conference using the transmission terminal 10*aa* in association with each other.

Referring back to FIG. 21, the transmission terminal 10*aa* transmits the user name (participant name) received from the NFC tag 22 to the transmission management apparatus 50 (Step S72). The subsequent processing is the same as that in the participant information display operation of the transmission system 1 according to the first embodiment described with reference to FIG. 15. At Step S72 to Steps S78-1 and S78-2 illustrated in FIG. 21, processing is performed for adding a new participant to a terminal management DB 5003 and displaying participant information on the display 120.

Referring back to FIG. 20, after the communication state shifts to the communicable state, the participant keeps the NFC tag 22 within the communication range of the NFC receiving unit 16. While the NFC tag 22 is kept within the communication range of the NFC receiving unit 16, the communicable state is maintained (Step 2).

To leave the video conference, the participant moves the NFC tag 22 out of the communication range of the NFC receiving unit 16. This causes the communication state to shift to the incommunicable state (Step S3). The shift of the communication state to the incommunicable state prevents the transmission terminal 10 from receiving the information previously received from the NFC tag 22.

Figure 23:
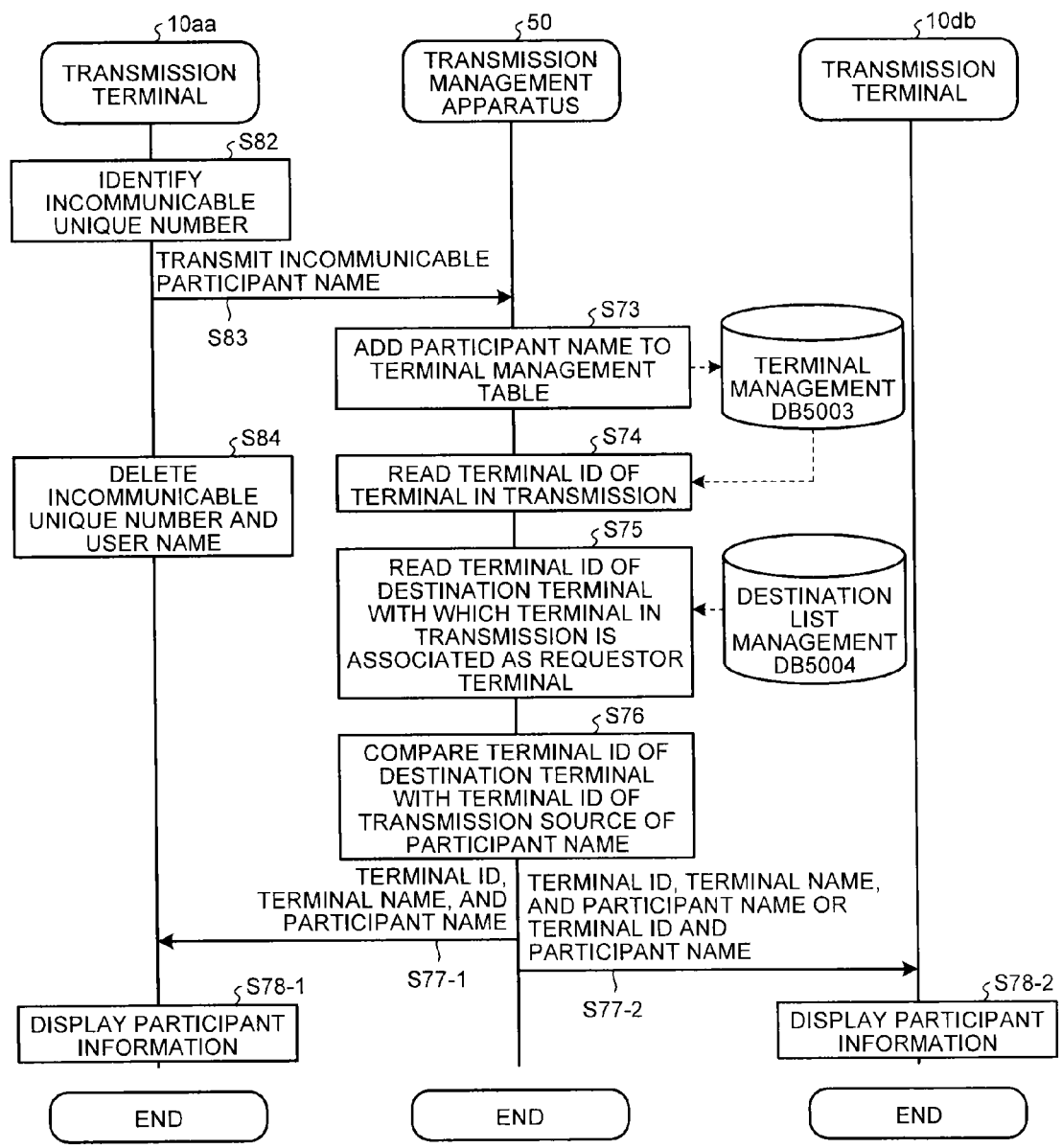
FIG. 23 is a sequence diagram of an operation for displaying leaver information.

FIG. 23 is a sequence diagram of an operation for displaying leaver information on the display 120 performed using the fact that the NFC receiving unit 16 of the transmission terminal 10 cannot receive the information from the NFC tag 22 as a trigger, that is, using the fact that the communication state shifts to the incommunicable state (Step 3) as a trigger. The display operation illustrated in FIG. 23 is nearly the same as the display operation of the transmission system 1 according to the first embodiment illustrated in FIG. 15.

In the display operation of the transmission system 1 according to the second embodiment illustrated in FIG. 23, if the NFC tag 22 moves out of the communication range, the NFC receiving unit 16 of the transmission terminal 10*aa* cannot receive the user name and the unique number previously received.

The NFC receiving unit 16 of the transmission terminal 10*aa* refers to the user name table of the storage unit 1000 (refer to FIG. 22), thereby identifying the unique number incapable of being received (Step S82). Subsequently, a transmitting and receiving unit 11 transmits the user name associated with the unique number incapable of being received in the user name table to the transmission management apparatus 50 as an incommunicable participant name (Step S83). After the transmission is completed, the transmitting and receiving unit 11 deletes the user name and the unique number incapable of being received from the user name table (Step S84).

The subsequent processing is the same as that in the participant information display operation of the transmission system 1 according to the first embodiment described with reference to FIG. 15. At Step S73 to Steps S78-1 and S78-2 illustrated in FIG. 23, processing is performed for deleting the participant from the terminal management DB 5003 and displaying leaver information on the display 120 in leaving of the participant.

Referring back to FIG. 20, while the NFC tag 22 is kept out of the communication range of the NFC receiving unit 16 after the communication state shifts to the incommunicable state, the incommunicable state is maintained (Step 4).

In the transmission system 1 according to the second embodiment, the transmission terminals 10 each store the participant names and the unique numbers of the participants in the video conference in the user name table. If a plurality of users are participating in the conference with one transmission terminal 10, the participant names and the unique numbers of the respective users can be stored. This makes it possible to determine whether the respective users are participating in the conference individually.

The configuration and the operation of the transmission system 1 according to the second embodiment other than those described above are the same as the configuration and the operation of the transmission system 1 according to the first embodiment.

In the present embodiment, the NFC tag 22 is used as a device that stores therein the user name and the unique number, and the NFC tag 22 performs NFC with the transmission terminal 10. Alternatively, an RFID tag is preferably used as an active tag instead of the NFC tag as a device that stores therein the user name, for example. The REID tag can perform wireless communication of a longer distance of approximately three meters, for example, than the NFC tag. Thus, in the transmission system 1, the user who has the RFID tag moves closer to the transmission terminal 10 or away from the transmission terminal 10, thereby notifying participants who use the other transmission terminals 10 of the participating user or the leaving user.

In the second embodiment, the transmission terminal 10 receives the unique number and the user name from the NFC tag 22 and stores them in the storage unit 1000. A modification of the transmission system 1 according to the second embodiment may receive only the user name, which is information identifying the user, from the NFC tag 22 and store it in the storage unit 1000. In this case, the transmission terminal 10 may detect leaving of a participant based on the fact that a user name stored in the storage unit 1000 cannot be received.

Third Embodiment

Figure 24:
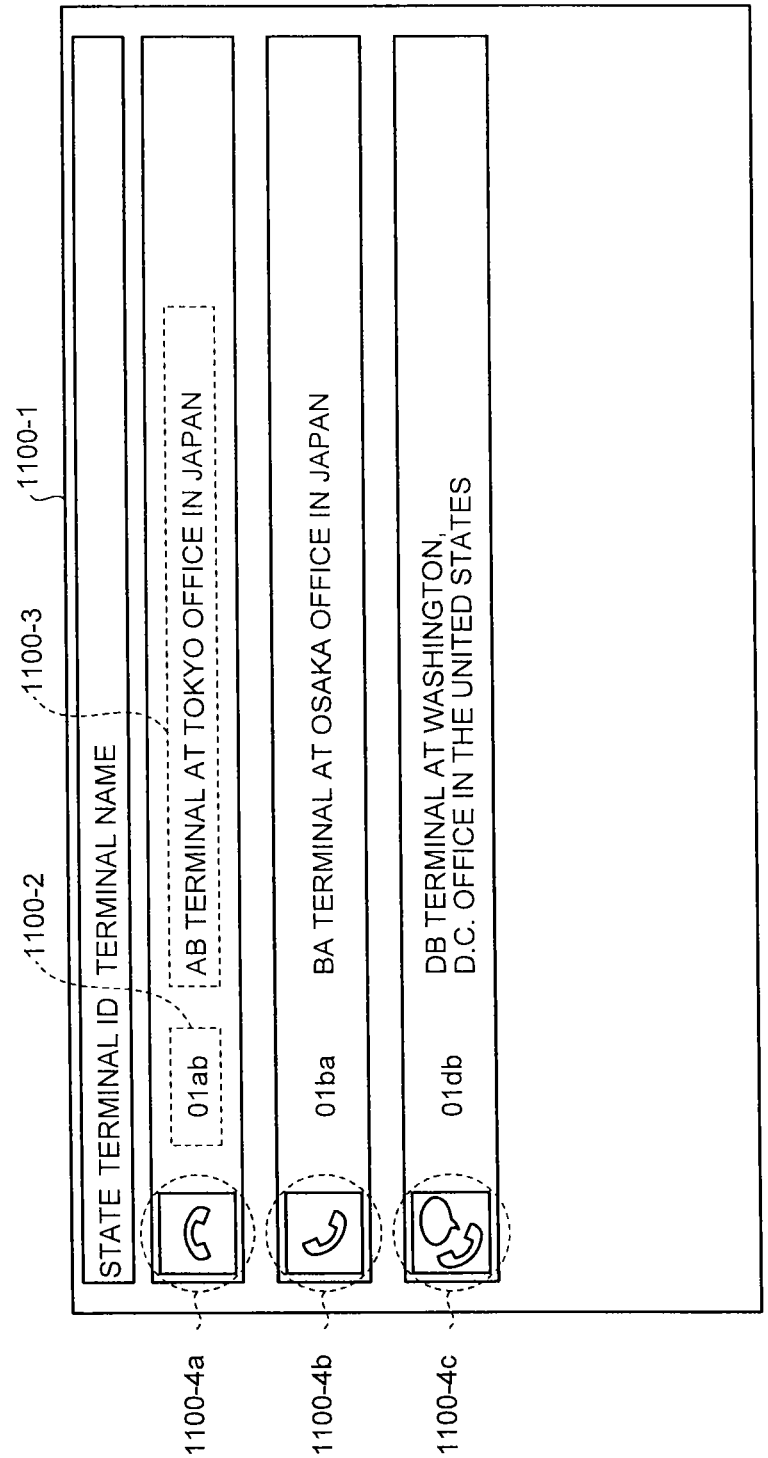
FIG. 24 is a schematic of a display example of a destination list.

A transmission system 1 according to a third embodiment will now be described. The transmission system 1 according to the third embodiment can display a participant name in a destination list. FIG. 24 is a schematic of a display example of the destination list displayed on a display 120*aa* of a transmission terminal 10*aa* by the processing described with reference to FIG. 12 in the first embodiment. The destination list includes a destination list frame 1100-1, a terminal ID 1100-2 of a destination terminal corresponding to the transmission terminal 10, a terminal name 1100-3, and icons 1100-4*a* to 1100-4*c* reflecting state information.

The icons include an off-line icon 1100-4*a*, a communicable icon 1100-4*b*, and a busy icon 1100-4*c*. The off-line icon 1100-4*a* indicates that the transmission terminal is off line and cannot establish a call. The communicable icon 1100-4*b* indicates that the transmission terminal is on line and is in a communicable state. The busy icon 1100-4*c* indicates that the transmission terminal is on line and is busy.

Figure 25:
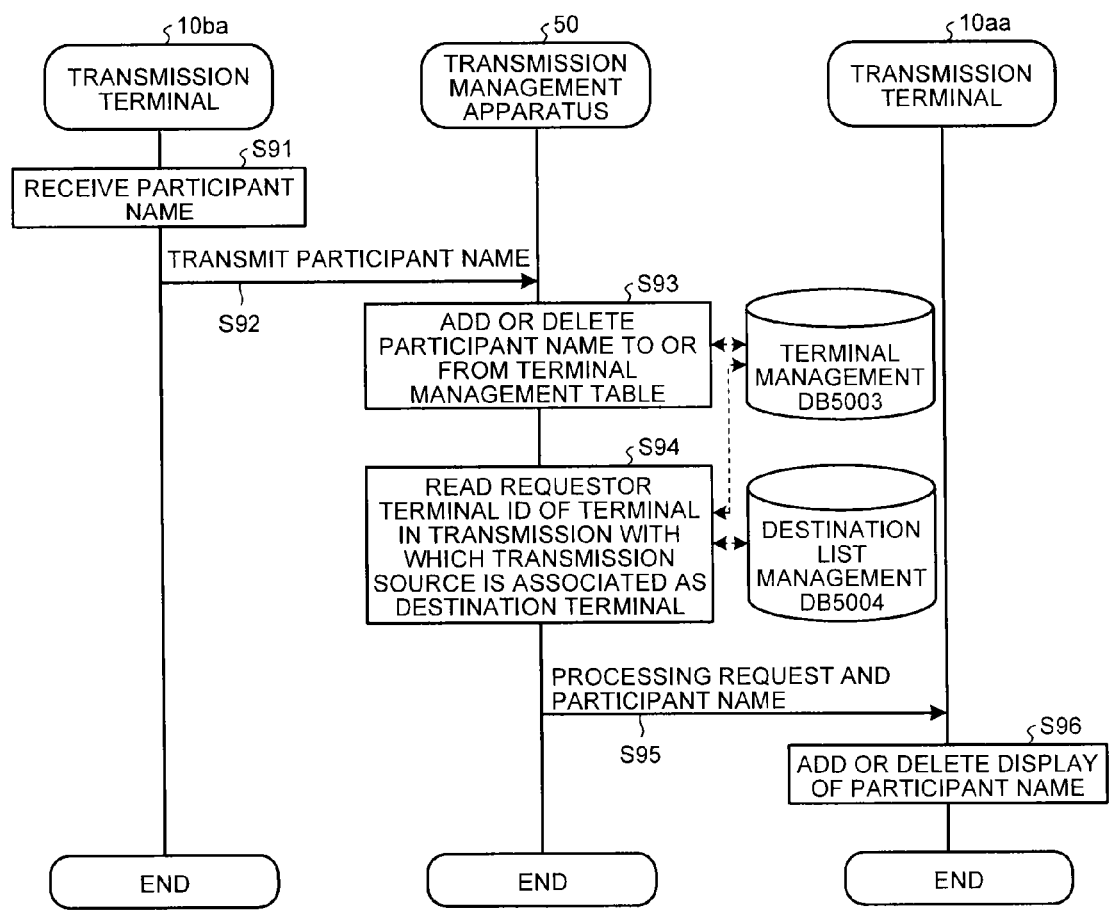
FIG. 25 is a sequence diagram of an operation for displaying a participant name.

FIG. 25 is a sequence diagram of an operation for displaying a participant name of a destination terminal performed when the participant name is registered in a terminal management DB 5003 while the destination list is being displayed. FIG. 25 illustrates an operation performed when a transmission terminal 10*ba* receives a user name (participant name) from an NFC tag 22.

In the transmission terminal 10*ba*, an NFC receiving unit 16 reads the user name, that is, the participant name stored in the NFC tag 22 (Step S91). A transmitting and receiving unit 11 transmits the read participant name to a transmission management apparatus 50 (Step S92).

If a transmitting and receiving unit 51 receives the participant name in the transmission management apparatus 50, a user name management unit 56 uses the IP address of the transmission source of the participant name as a search key to search the terminal management DB 5003 (refer to FIG. 10). The user name management unit 56 updates the participant name associated with the terminal ID of the transmission terminal serving as the transmission source (Step S93). Specifically, if the received participant name is not registered in the terminal management DB 5003, the user name management unit 56 adds the received participant name to the space for the participant name corresponding to the terminal ID of the transmission terminal serving as the transmission source. By contrast, the fact that the received participant name is registered in the terminal management DB 5003 means that the participant brings the NFC tag 22 closer to the NFC receiving unit 16 to leave the conference. In this case, the user name management unit 56 deletes the registered participant name from the terminal management DB 5003.

A terminal extracting unit 54 refers to a destination list management DB 5004 to extract terminal IDs of requestor terminals that specify the terminal serving as the transmission source of the participant name as the destination terminal. Furthermore, the terminal extracting unit 54 refers to the terminal management DB 5003 to extract a terminal ID associated with the transmission state of the in-transmission state among the terminal IDs of the requestor terminals (Step S94). The transmitting and receiving unit 51 transmits the participant name received at Step S92, the terminal ID of the terminal serving as the transmission source of the participant name, and a processing request for the participant name to the requestor terminals extracted at Step S94 (Step S95). If addition processing of the participant name is performed at Step S93, the processing request is made for addition of the participant name. If deletion processing of the participant name is performed at Step S93, the processing request is made for deletion of the participant name.

In the terminal 10 that receives the processing request, the participant name, and the terminal ID of the transmission source of the participant name, a display control unit 17 adds or deletes display of the participant name in response to the processing request (Step S96). Specifically, if a processing request for addition of the participant name is received, the display control unit 17 adds and displays the participant name to the destination list. By contrast, if a processing request for deletion of the participant name is received, the display control unit 17 deletes the participant name relating to the processing request from the destination list. Thus, the processing is terminated.

In the example of the destination list management DB 5004 illustrated in FIG. 11, the terminal IDs "01aa", "01cb", and "01db" are extracted as the terminal ID with which the transmission terminal 10ba is associated as the destination terminal at Step S94. Subsequently, the processing request, the participant name, and the terminal ID are transmitted to the transmission terminals 10 identified by these terminal IDs at Step S95.

Figure 26:
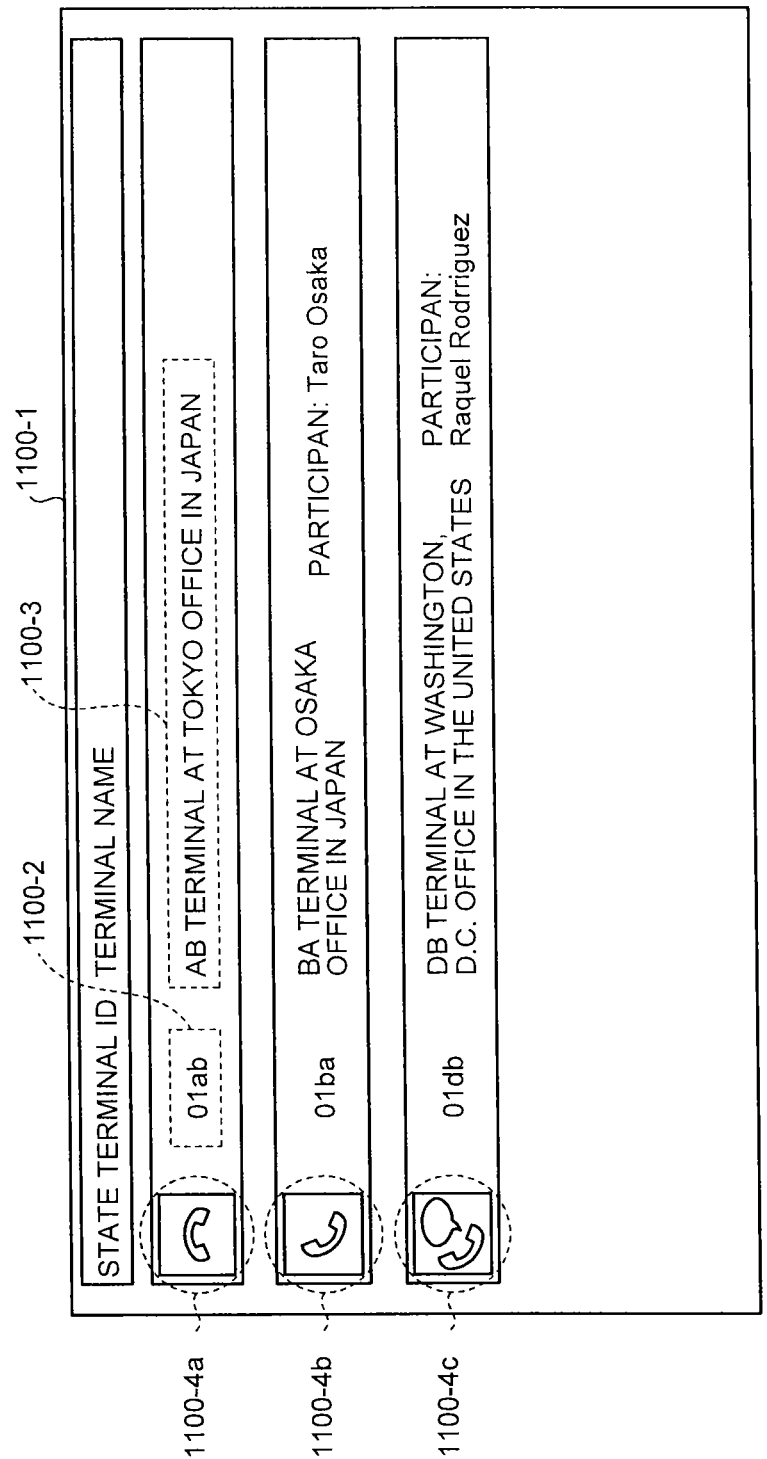
FIG. 26 is a schematic of a display example of the destination list to which participant names are added.

FIG. 26 is a schematic of a display example of the destination list displayed on the display 120aa of the transmission terminal 10aa after the participant name is received together with the processing request for addition of the participant name. If the transmitting and receiving unit 11 receives a participant name "Taro Osaka" and the terminal ID "01ba" together with the processing request for addition of the participant name after the destination list is displayed in the transmission terminal 10aa, the display control unit 17 adds display of the participant name "Taro Osaka" in association with the terminal ID "01ba" as illustrated in FIG. 26. Furthermore, if the transmitting and receiving unit 11 receives a participant name "Raquel Rodrriguez" and the terminal ID "01db" together with the processing request for addition of the participant name from the transmission terminal 10db, the display control unit 17 adds display of the participant name "Raquel Rodrriguez" in association with the terminal ID "01db" as illustrated in FIG. 26.

If the transmitting and receiving unit 11 receives the participant name "Taro Osaka" and the terminal ID "01ba" together with the processing request for deletion of the participant name in the state where the participant names are displayed as illustrated in FIG. 26, the display control unit 17 deletes the participant name "Taro Osaka" displayed in association with the terminal ID "01ba".

As described above, the transmission system 1 according to the third embodiment can display the participant name in the destination list. This can facilitate the user's grasp of the participant name besides the transmission state of the destination terminal.

Furthermore, the transmission system 1 according to the third embodiment can display a participant name of a certain destination terminal alone while displaying the destination list.

Figure 27:
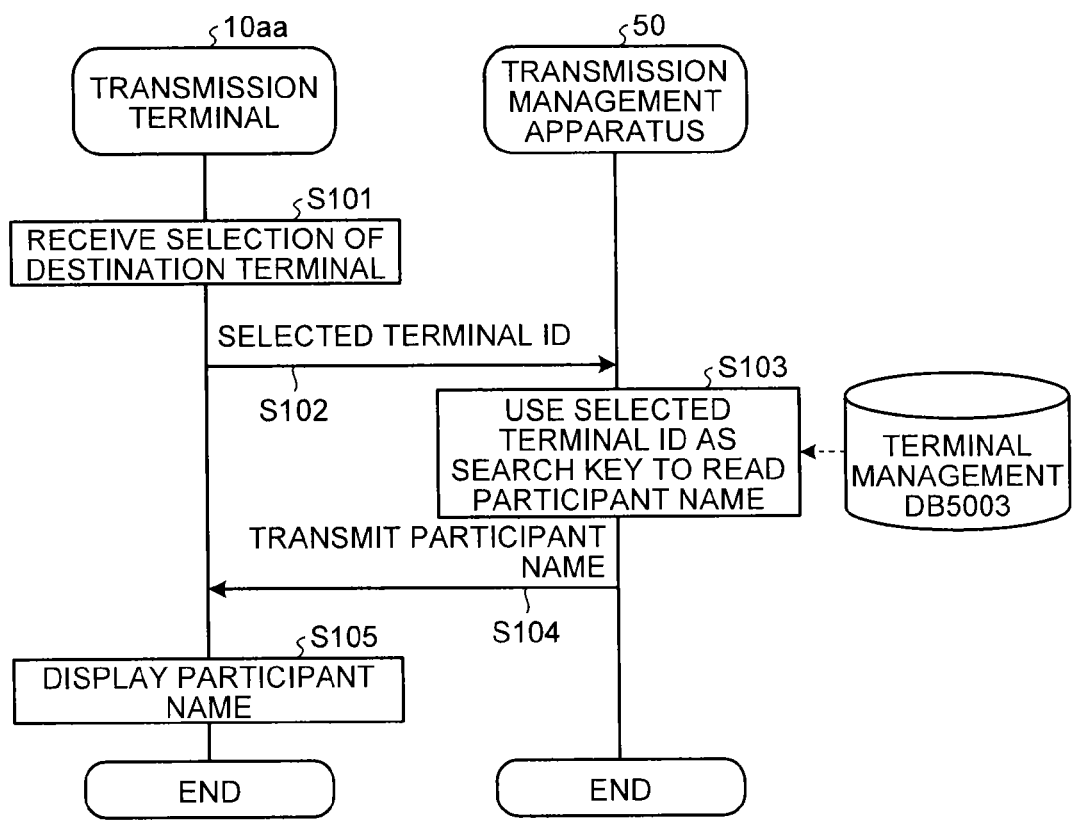
FIG. 27 is a sequence diagram of an operation for displaying a participant name of a certain destination terminal.

FIG. 27 is a sequence diagram of an operation for displaying a participant name of a certain destination terminal. In the transmission terminal 10aa, the user selects a destination terminal for which display of the participant name is desired by an operation of an operation button 108, for example. Thus, an operation input receiving unit 12 receives selection of the destination terminal (Step S101). The transmitting and receiving unit 11 transmits the terminal ID of the destination terminal to the transmission management apparatus 50 (Step S102).

If the transmitting and receiving unit 51 receives the terminal ID of the destination terminal in the transmission management apparatus 50, the user name management unit 56 uses the terminal ID as a search key to search a terminal management table (refer to FIG. 10). The user name management unit 56 reads the participant name corresponding to the terminal ID (Step S103). The transmitting and receiving unit 51 transmits the read participant name to the transmission terminal 10aa serving as the transmission source of the terminal ID of the destination terminal (Step S104).

If the transmitting and receiving unit 11 receives the participant name, the transmission terminal 10aa displays the received participant name on the display 120aa in association with the terminal ID of the destination terminal selected at Step S101 (Step S105). Thus, the processing is terminated.

Figure 28:
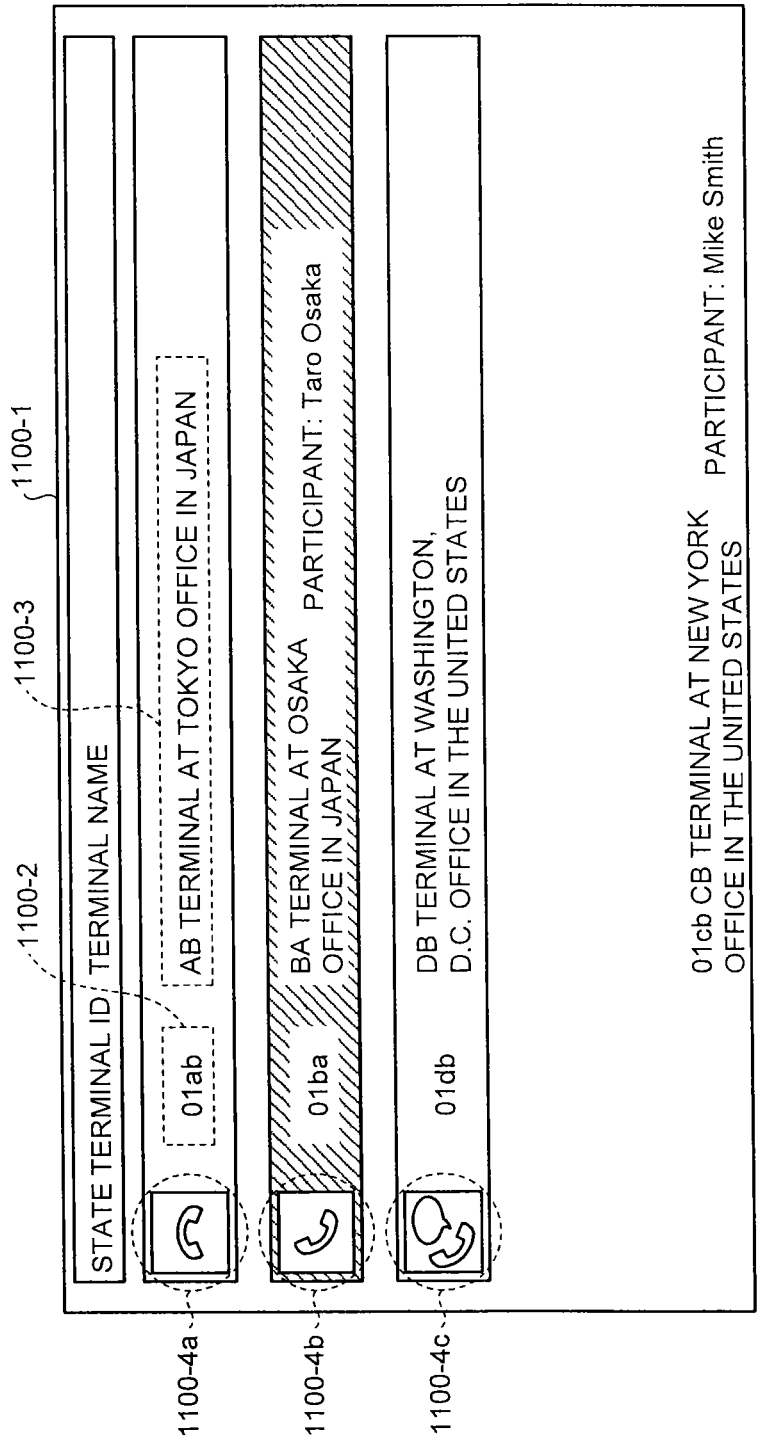
FIG. 28 is a schematic of a display example of the destination list to which the participant name of the certain destination is added.

An assumption is made that the user selects the terminal 10ba with the terminal ID "01ba" in the state where the display 120aa of the transmission terminal 10aa displays the destination list illustrated in FIG. 24, for example. In this case, the transmission terminal 10aa transmits the terminal ID "01ba" to the transmission management apparatus 50 by the processing illustrated in FIG. 27 (Step S102). The transmission management apparatus 50 refers to the terminal management table (refer to FIG. 10) and reads the participant name "Taro Osaka" corresponding to the terminal ID "01ba" (Step S103). The transmission management apparatus 50 transmits the participant name "Taro Osaka" to the transmission terminal 10aa. The transmission terminal 10aa adds and displays the participant name "Taro Osaka" to the destination list as illustrated in FIG. 28 (Step S105). In the example of FIG. 28, the terminal ID, the terminal name, and the participant name of the terminal itself are displayed at the lower part of the display screen of the destination list.

The configuration and the operation of the transmission system 1 according to the third embodiment other than those described above are the same as the configuration and the operation of the transmission system 1 according to the other embodiments.

Figure 29:
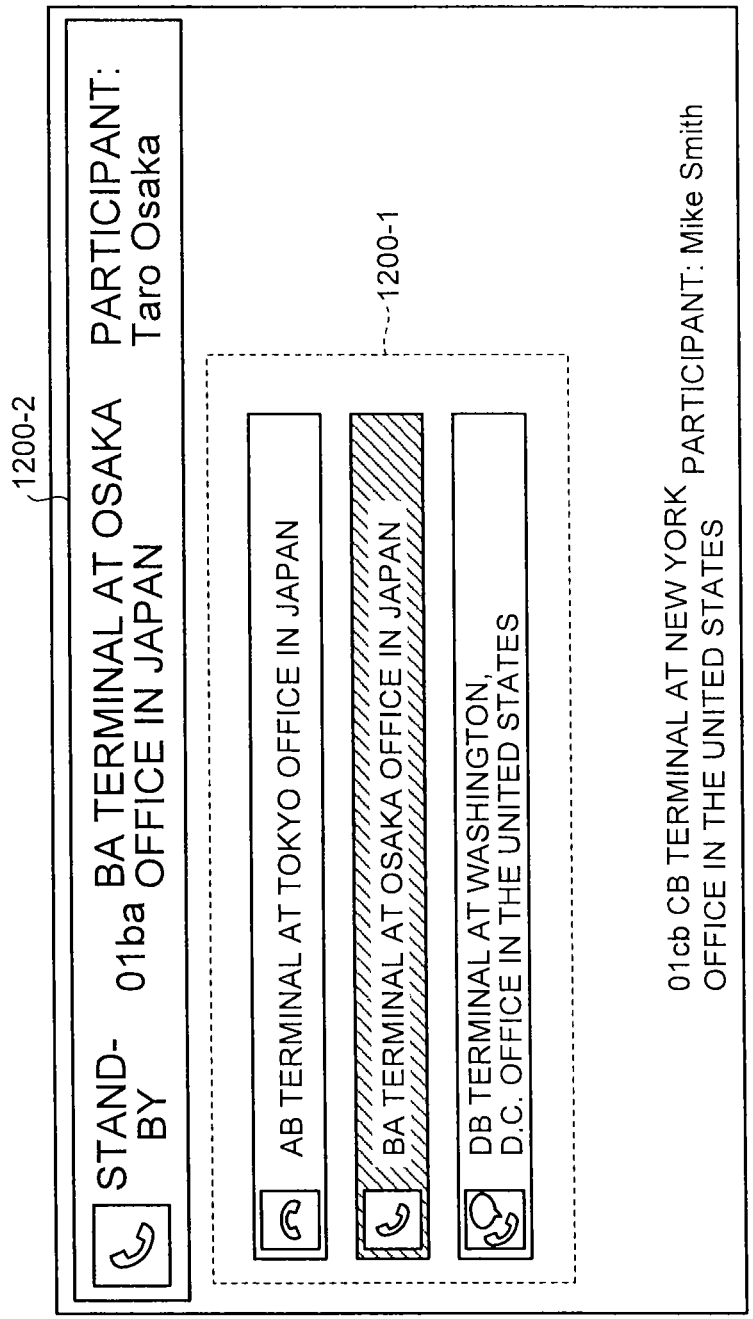
FIG. 29 is a schematic of a display example of a destination list according to another example.

In another example, a focus area 1200-2 may be provided separately from a destination list frame 1200-1 as illustrated in FIG. 29. Detailed information, such as the transmission state, the terminal ID, and the participant name of the selected destination terminal, may be displayed in the focus area 1200-

2. In addition, the font size of the focus area 1200-2 is set larger than that of the destination list frame 1200-1. Thus, the position of the focus area 1200-2 is fixed, and the font size thereof is set larger than those of other areas. This can facilitate the user's grasp of the information relating to the selected destination terminal.

Supplementary Explanation of the Embodiment

The relay apparatus 30, the transmission management apparatus 50, and the computer program providing apparatus 90 according to the embodiments each may be formed of a single computer or a plurality of computers to which the units (functions or units) are divided and allocated arbitrarily.

If the computer program providing apparatus 90 is formed of a single computer, the computer program transmitted by the computer program providing apparatus 90 may be transmitted in a manner divided or not divided into a plurality of modules.

By contrast, if the computer program providing apparatus 90 is formed of a plurality of computers, the computer program may be transmitted from the computers in a manner divided into a plurality of modules.

The recording medium, such as a CD-ROM, storing therein the transmission terminal control program, the relay apparatus program, or the transmission management program, the HD 204 storing therein these computer programs, and the computer program providing apparatus 90 including the HD 204 according to the embodiments are used as computer program products to provide the transmission terminal control program, the relay apparatus program, and the transmission management program to a user at home or abroad, for example.

While the IP addresses of the transmission terminals 10 are stored in FIG. 10, the stored information is not limited thereto. Any information may be stored as long as it is information for identifying the transmission terminals 10 on the transmission network 2. The fully qualified domain names (FQDN) of the transmission terminals 10 may be stored, for example. In this case, a well-known domain name system (DNS) server acquires the IP addresses corresponding to the FQDNs.

While the explanation has been made of the case where the transmission system 1 is applied to the video conference system in the embodiments, for example, it is not necessarily applied thereto. The transmission system 1 may be applied to a telephone system, such as IP phone and Internet phone.

Alternatively, the transmission system 1 may be applied to a car navigation system. In this case, for example, a transmission terminal 10 corresponds to a car navigation device mounted on a car, and another transmission terminal 10 corresponds to a management terminal or a management server of a management center that manages the car navigation device or to another car navigation device mounted on another car. Still alternatively, the transmission system 1 may be formed of the transmission terminals 10 provided as mobile phones.

While the explanation has been made of the case where the content data is image data and audio data in the embodiments, for example, it is not limited thereto. The content data may be touch data. In this case, a sense of touch made by a user on a transmission terminal is transmitted to another transmission terminal.

Alternatively, the content data may be smell data. In this case, a smell (an odor) in a transmission terminal is transmitted to another transmission terminal. The content data may be at least one piece of data among image data, audio data, touch data, and smell data.

While the explanation has been made of the case where the transmission system 1 is used to hold a video conference in the embodiments, it is not necessarily applied thereto. The transmission system 1 may be used for a meeting, a typical conversation between family members and between friends, or unidirectional presentation of information, for example.

The first embodiment includes the following invention.

1. A transmission system comprising:
   a plurality of transmission terminals; and
   a transmission management system that manages the transmission terminals, wherein
   each of the transmission terminals comprises:
      an acquiring unit that acquires user identification information identifying a user from a device that stores therein the user identification information; and
      a first transmitting unit that transmits the user identification information to the transmission management system,
   the transmission management system comprises:
      a first storage unit that stores therein transmission terminal identification information identifying the transmission terminals and transmission states indicating whether the transmission terminals are in transmission in association with each other;
      a first receiving unit that receives the user identification information from the transmission terminals; and
      a user identification information management unit that stores the user identification information in association with the transmission terminal identification information of the transmission terminals serving as transmission sources of the user identification information in the first storage unit,
   the first transmitting unit of each of the transmission terminals transmits a request for presentation of information relating to transmission terminals in the transmission, to the transmission management system,
   the transmission management system further comprises:
      a first extracting unit that refers to, when the first receiving unit receives the request for presentation from a certain transmission terminal, the first storage unit and extracts transmission terminal identification information of the transmission terminals in the transmission and user identification information associated with the transmission terminal identification information; and
      a second transmitting unit that transmits the extracted transmission terminal identification information and the extracted user identification information in association with each other to the transmission terminal serving as the transmission source of the request for presentation, and
   each of the transmission terminals further comprises:
      a second receiving unit that receives the transmission terminal identification information and the user identification information; and
      a display control unit that displays the transmission terminal identification information and the user identification information received by the second receiving unit in association with each other on a display unit.

2. The transmission system according to 1 described above, wherein
   the device is a tag wirelessly communicable with the transmission terminals, and
   the acquiring unit receives user identification information from the tag via wireless communication.

3. The transmission system according to 2 described above, wherein the wireless communication is performed using electromagnetic induction.

4. The transmission system according to 2 described above, wherein the wireless communication is performed using microwaves.

5. The transmission system according to 1 described above, wherein
the transmission management system further comprises:
a second storage unit that stores therein transmission terminal identification information of a requestor terminal serving as a transmission terminal of a requestor of a request for the transmission with a certain transmission terminal, transmission terminal identification information of a destination terminal serving as a transmission terminal of a destination of the request for the transmission, and a terminal name of the destination terminal in association with one another; and
a second extracting unit that refers to, when the first receiving unit receives the request for presentation from the certain transmission terminal, the second storage unit and extracts transmission terminal identification information of a destination terminal with which the transmission terminal serving as a transmission source of the request for presentation is associated as a requestor terminal and a terminal name of the destination terminal, and
the second transmitting unit of the transmission management system transmits, when the transmission terminal identification information extracted by the first extracting unit is identical to the transmission terminal identification information of the destination terminal extracted by the second extracting unit, the transmission terminal identification information of the destination terminal, the terminal name of the destination terminal, and the user identification information in association with one another to the transmission terminal serving as the transmission source.

6. The transmission system according to 1 described above, wherein
each of the transmission terminals further comprises an input receiving unit that receives input of the request for presentation from a user, and
the first transmitting unit transmits, when the input receiving unit receives the input of the request for presentation, the request for presentation to the transmission management system.

7. A transmission terminal whose transmission state is managed by a transmission management system, the transmission terminal comprising:
an acquiring unit that acquires user identification information for identifying a user who participates in transmission with the transmission terminal from a device that stores therein the user identification information;
a transmitting unit that transmits the user identification information to the transmission management system and transmits a request for presentation of information relating to a terminal in transmission to the transmission system in accordance with an instruction issued from the user;
a receiving unit that receives transmission terminal identification information of the transmission terminal in transmission and the user identification information associated with the transmission terminal identification information from the transmission system in response to the request for presentation; and
a display control unit that displays the transmission terminal identification information and the user identification information received by the receiving unit in association with each other on a display unit.

8. A transmission management system that manages a plurality of transmission terminals, the transmission management system comprising:
a storage unit that stores therein transmission terminal identification information for identifying each of the transmission terminals and a transmission state indicating whether the transmission terminal is in transmission in association with each other;
a receiving unit that receives user identification information for identifying a user who participates in transmission with the transmission terminal read by the transmission terminal from a device that stores therein the user identification information;
a user identification information management unit that stores the user identification information in association with the transmission terminal identification information of the transmission terminal serving as a transmission source of the user identification information in the first storage unit;
an extracting unit that refers to, when the receiving unit receives a request for presentation of information relating to the transmission terminal in transmission from a certain transmission terminal, the storage unit and extracts the transmission terminal identification information of the transmission terminal in transmission and the user identification information associated with the transmission terminal identification information; and
a transmitting unit that transmits the extracted transmission terminal identification information and the extracted user identification information in association with each other to the transmission terminal serving as the transmission source of the request for presentation.

9. A computer program that causes a computer whose transmission state is managed by a transmission management system to function as:
an acquiring unit that acquires user identification information for identifying a user who participates in transmission with the transmission terminal from a device that stores therein the user identification information;
a transmitting unit that transmits the user identification information to the transmission management system and transmits a request for presentation of information relating to a terminal in transmission to the transmission system in accordance with an instruction issued from the user;
a receiving unit that receives transmission terminal identification information of the transmission terminal in transmission and the user identification information associated with the transmission terminal identification information from the transmission system in response to the request for presentation; and
a display control unit that displays the transmission terminal identification information and the user identification information received by the receiving unit in association with each other on a display unit.

10. A computer program that causes a computer including a storage unit that stores therein transmission terminal identification information for identifying a transmission terminal serving as a management target and a transmission state indicating whether the transmission terminal is in transmission in association with each other to function as:
a receiving unit that receives user identification information for identifying a user who participates in transmission with the transmission terminal read by the transmission terminal from a device that stores therein the user identification information;
a user identification information management unit that stores the user identification information in association with the transmission terminal identification information of the transmission terminal serving as a transmission source of the user identification information in the first storage unit;
an extracting unit that refers to, when the receiving unit receives a request for presentation of information relating to the transmission terminal in transmission from a certain transmission terminal, the storage unit and extracts the transmission terminal identification information of the transmission terminal in transmission and the user identification information associated with the transmission terminal identification information; and
a transmitting unit that transmits the extracted transmission terminal identification information and the extracted user identification information in association with each other to the transmission terminal serving as the transmission source of the request for presentation.

Embodiment 2

To describe the embodiment 2, FIG. 1 to FIG. 29 referred to in the first embodiment are used. An overlapping description thereof is omitted, and only a part different from that in the first embodiment is explained.

Destination List Management Table

The storage unit 5000 stores therein the destination list management DB 5004 including the destination list management table illustrated in FIG. 11. In the embodiment 2, the destination list management DB 5004 corresponds to a destination terminal identification information storage unit.

At Step S74 in FIG. 15, FIG. 21, and FIG. 23, the terminal extracting unit 54 functions as a transmission terminal identification information extracting unit. The transmission terminal identification information extracting unit extracts the terminal name of the transmission terminal 10aa serving as the transmission source of the participant name from the terminal management DB 5003 serving as the first storage unit and extracts the terminal ID associated with the transmission state of an in-transmission state.

If the terminal 10 serving as the transmission source of the participant name is registered as the destination terminal with which the transmission terminal 10 to which the participant name is to be transmitted is associated as the requestor terminal in the destination list management DB 5004 (refer to FIG. 11), the transmitting and receiving unit 51 transmits the participant information including the terminal ID, the terminal name, and the participant name of the terminal 10 serving as the transmission source of the participant name to the transmission terminal. The terminal state acquiring unit 55 and the transmitting and receiving unit 11 function as a transmission terminal identification information extracting unit. The transmission terminal identification information extracting unit refers to the destination list management DB 5004 serving as the destination terminal identification information storage unit. Furthermore, the transmission terminal identification information extracting unit extracts the terminal ID of the requester terminal with which the transmission terminal 10aa serving as the transmission source of the participant name is associated as the destination terminal among the transmission terminals in transmission and the terminal name of the transmission terminal 10aa serving as the transmission source.

At Step S82 in FIG. 18 and FIG. 23, the user name table functions as the user identification information.

The embodiment 2 includes the following invention.

1. A transmission system comprising:
   a plurality of transmission terminals; and
   a transmission management system that manages the transmission terminals, wherein
   each of the transmission terminals comprises:
      an acquiring unit that acquires user identification information identifying a user from a device that stores therein the user identification information; and
      a first transmitting unit that transmits the user identification information to the transmission management system,
   the transmission management system comprises:
      a first storage unit that stores therein transmission terminal identification information identifying the transmission terminals and transmission states indicating whether the transmission terminals are in transmission in association with each other;
      a first receiving unit that receives the user identification information from the transmission terminals;
      a transmission terminal identification information extracting unit that extracts, when the first receiving unit receives the user identification information, transmission terminal identification information associated with the transmission state of an in-transmission state from the first storage unit; and
      a second transmitting unit that transmits the user identification information received by the first receiving unit and transmission terminal identification information of a transmission terminal serving as a transmission source of the user identification information in association with each other to a transmission terminal in the transmission, and
   each of the transmission terminals further comprises:
      a second receiving unit that receives the transmission terminal identification information and the user identification information; and
      a display control unit that displays the transmission terminal identification information and the user identification information received by the second receiving unit in association with each other on a display unit.

2. The transmission system according to 1 described above, wherein the second transmitting unit transmits the user identification information in association with the transmission terminal identification information of the transmission source, to all transmission terminals identified by the transmission terminal identification information associated with the transmission state of the in-transmission state in the first storage unit.

3. The transmission system according to 1 described above, wherein
   the device is a tag wirelessly communicable with the transmission terminals, and
   the acquiring unit receives the user identification information from the tag via wireless communication.

4. The transmission system according to 3 described above, wherein the wireless communication is performed using electromagnetic induction.

5. The transmission system according to 3 described above, wherein the wireless communication is performed using microwaves.

6. The transmission system according 3 described above, wherein
   the acquiring unit receives the user identification information via the wireless communication when the wireless communication is established by the tag coming closer to a transmission terminal, and the first transmitting unit transmits the user identification information to the transmission management system every time the acquiring unit receives the user identification information.

7. The transmission system according to 1 described above, wherein each of the transmission terminals further comprises a user identification information storage unit that stores therein the user identification information acquired by the acquiring unit, the first transmitting unit of each of the transmission terminals transmits, when the acquiring unit becomes unable to acquire user identification information stored in the user identification information storage unit, the user identification information to the transmission management system, the transmission management system further comprises a user identification information management unit that writes, when the first receiving unit receives user identification information that is not stored in the first storage unit, the user identification information in association with transmission terminal identification information of a transmission terminal serving as a transmission source of the user identification information, in the first storage unit and that deletes, when the first receiving unit receives user identification information stored in the first storage unit, the user identification information from the first storage unit, and the second transmitting unit of the transmission management system transmits, when the first receiving unit receives user identification information that is not stored in the first storage unit, the user identification information together with information indicating that a corresponding user is a new participant to the transmission to the transmission terminal and transmits, when the first receiving unit receives user identification information stored in the first storage unit, the user identification information together with information indicating that a corresponding user is a leaver from the transmission to the transmission terminal.

8. The transmission system according to 1 described above, wherein the transmission management system further comprises:
a third storage unit that stores therein transmission terminal identification information of a requestor terminal serving as a transmission terminal of a requestor of a request for the transmission and transmission terminal identification information of a destination terminal serving as a transmission terminal of a destination of the request for the transmission in association with each other; and a requestor terminal identification information extracting unit that refers to the third storage unit and extracts transmission terminal identification information of a requestor terminal with which the transmission source of the user identification information is associated as a destination terminal among the transmission terminals in the transmission, the first storage unit further stores therein terminal names of the transmission terminals in association with the transmission terminal identification information, the transmission terminal identification information extracting unit extracts a terminal name of the transmission terminal serving as the transmission source of the user identification information from the first storage unit, and the second transmitting unit transmits the user identification information, the transmission terminal identification information of the transmission source, and the terminal name of the transmission source in association with one another to the requestor terminal with which the transmission source of the user identification information is associated as the destination terminal among the transmission terminals in the transmission.

9. A transmission management system that manages a transmission terminal, the transmission management system comprising:

a storage unit that stores therein transmission terminal identification information for identifying the transmission terminal and a transmission state indicating whether the transmission terminal is in transmission in association with each other;

a receiving unit that receives user identification information for identifying a user who participates in transmission with the transmission terminal read by the transmission terminal from a device that stores therein the user identification information;

an extracting unit that extracts, when the receiving unit receives the user identification information, the transmission terminal identification information associated with the transmission state of an in-transmission state from the storage unit; and a transmitting unit that transmits the user identification information received by the receiving unit and the transmission terminal identification information of the transmission terminal serving as the transmission source of the user identification information in association with each other to the transmission terminal in transmission.

10. A computer program that causes a computer including a storage unit that stores therein transmission terminal identification information for identifying a transmission terminal and a transmission state indicating whether the transmission terminal is in transmission in association with each other to function as:

a receiving unit that receives user identification information for identifying a user who participates in transmission with the transmission terminal read by the transmission terminal from a device that stores therein the user identification information;

an extracting unit that extracts, when the receiving unit receives the user identification information, the transmission terminal identification information associated with the transmission state of an in-transmission state from the storage unit; and a transmitting unit that transmits the user identification information received by the receiving unit and the transmission terminal identification information of the transmission terminal serving as the transmission source of the user identification information in association with each other to the transmission terminal in transmission.

Embodiment 3

To describe the embodiment 3, FIG. 1 to FIG. 29 referred to in the first embodiment are used. An overlapping description thereof is omitted, and only a part different from that in the first embodiment is explained.

Terminal Management Table

The storage unit 5000 stores therein the terminal management DB 5003 including the terminal management table illustrated in FIG. 10. In the embodiment 3, the terminal management DB 5003 corresponds to a transmission state storage unit.

Destination List Management Table

The storage unit 5000 stores therein the destination list management DB 5004 including the destination list management table illustrated in FIG. 11. In the embodiment 3, the destination list management DB 5004 corresponds to the destination terminal identification information storage unit. At Step S82 in FIG. 22, the NFC receiving unit 16 of the transmission terminal 10aa refers to the user name table of the storage unit 1000, thereby identifying the unique number incapable of being received. In the embodiment 3, the user name table functions as the user identification information storage unit.

At Step S94 in FIG. 25, the terminal extracting unit 54 functions as a requestor terminal information extracting unit that extracts the terminal ID of the requestor terminal from the destination list management DB 5004 serving as the destination terminal identification information storage unit. In addition, the terminal extracting unit 54 functions as the transmission terminal identification information extracting unit that extracts the terminal ID of the requestor terminal in transmission from the terminal management DB 5003 serving as the transmission state storage unit.

At Step S103, the user name management unit 56 functions as the user identification information storage unit.

The embodiment 3 includes the following invention.

1. A transmission system comprising:
    a plurality of transmission terminals; and
    a transmission management system that manages the transmission terminals, wherein
    each of the transmission terminals comprises:
        an acquiring unit that acquires user identification information identifying a user from a device that stores therein the user identification information; and
        a first transmitting unit that transmits the user identification information to the transmission management system,
    the transmission management system comprises:
        a first receiving unit that receives the user identification information from the transmission terminals;
        a destination terminal identification information storage unit that stores therein transmission terminal identification information identifying a requestor terminal serving as a transmission terminal of a requestor of a request for the transmission and transmission terminal identification information identifying a destination terminal serving as a transmission terminal of a destination of the request for the transmission in association with each other;
        a requestor terminal identification information extracting unit that refers to the destination terminal identification information storage unit and extracts transmission terminal identification information of a requestor terminal with which a transmission terminal serving as a transmission source of user identification information received by the first receiving unit is associated as a destination terminal; and
        a first transmitting unit that transmits the user identification information and the transmission terminal identification information of the transmission terminal serving as the transmission source of the user identification information in association with each other to the requestor terminal extracted by the requestor terminal identification information extracting unit, and
    each of the transmission terminals further comprises:
        a second receiving unit that receives the transmission terminal identification information and the user identification information; and
        a display control unit that displays the transmission terminal identification information and the user identification information received by the second receiving unit in association with each other on a display unit.

2. The transmission system according to 1 described above, wherein
    the transmission management system further comprises:
        a transmission state storage unit that stores therein any one of transmission states of an in-transmission state, a transmittable state, and a non-transmittable state in association with transmission terminal identification information of each of the transmission terminals; and
        a transmission terminal identification information extracting unit that extracts transmission terminal identification information of a requestor terminal associated with the transmission state of the in-transmission state or the transmittable state in the transmission state storage unit among the requestor terminal extracted by the requestor terminal identification information extracting unit, and
    the first transmitting unit transmits user identification information and transmission terminal identification information of a transmission terminal serving as a transmission source of the user identification information in association with each other to the requestor terminal extracted by the transmission terminal identification information extracting unit.

3. The transmission system according to 1 described above, wherein
    the transmission management system further comprises:
        a user identification information management unit that stores user identification information received by the first receiving unit and transmission terminal identification information of a transmission terminal serving as a transmission source of the user identification information in association with each other in a transmission state storage unit; and
        a user identification information extracting unit that refers to, when the first receiving unit receives a request for presentation together with transmission terminal identification information of a certain destination terminal from a transmission terminal, the transmission state storage unit and extracts user identification information associated with the transmission terminal identification information of the certain destination terminal, and
    the first transmitting unit transmits the user identification information extracted by the user identification information extracting unit to the transmission terminal serving as the transmission source of the request for presentation.

4. The transmission system according to 3 described above, wherein
    each of the transmission terminals further comprises a user identification information storage unit that stores therein the user identification information acquired by the acquiring unit,
    the first transmitting unit of each of the transmission terminals transmits, when the acquiring unit becomes unable to acquire user identification information stored in the user identification information storage unit, the user identification information that becomes unable to be acquired to the transmission management system, and the user identification information management unit of the transmission management system writes, when the first receiving unit receives user identification information that is not stored in the user identification information storage unit, the user identification information in association with transmission terminal identification information of a transmission terminal serving as a transmission source of the user identification information in the user identification information storage unit and deletes, when the first receiving unit receives user identification information stored in the user identification information storage unit, the user identification information from the user identification information storage unit.

5. The transmission system according to 1 described above, wherein
the device is a tag wirelessly communicable with the transmission terminals, and
the acquiring unit receives the user identification information from the tag via wireless communication.

6. The transmission system according to 5 described above, wherein the wireless communication is performed using electromagnetic induction.

7. The transmission system according to 5 described above, wherein the wireless communication is performed using microwaves.

8. The transmission system according to 5 described above, wherein
the acquiring unit receives the user identification information via the wireless communication when the wireless communication is established by the tag coming closer to a transmission terminal, and
the first transmitting unit transmits the user identification information to the transmission management system every time the acquiring unit receives the user identification information.

9. A transmission management system that manages a plurality of transmission terminals, the transmission management system comprising:
a receiving unit that receives user identification information for identifying a user who participates in transmission with each of the transmission terminals read by the transmission terminal from a device that stores therein the user identification information;
a storage unit that stores therein transmission terminal identification information for identifying a requestor terminal serving as the transmission terminal of a requestor of a request for the transmission and transmission terminal identification information for identifying a destination terminal serving as the transmission terminal of a destination of the request for the transmission in association with each other;
an extracting unit that refers to the storage unit and extracts the transmission terminal identification information of the requestor terminal with which the transmission terminal serving as the transmission source of the user identification information received by the receiving unit is associated as the destination terminal; and
a transmitting unit that transmits the user identification information and the transmission terminal identification information of the transmission terminal serving as the transmission source of the user identification information in association with each other to the requestor terminal extracted by the extracting unit.

10. A computer program that causes a computer including a storage unit that stores therein transmission terminal identification information for identifying a requestor terminal serving as a transmission terminal of a requestor of a request for the transmission and transmission terminal identification information for identifying a destination terminal serving as the transmission terminal of a destination of the request for the transmission in association with each other to function as:
a receiving unit that receives user identification information for identifying a user who participates in transmission with the transmission terminal read by the transmission terminal from a device that stores therein the user identification information;
an extracting unit that refers to the storage unit and extracts the transmission terminal identification information of the requestor terminal with which the transmission terminal serving as the transmission source of the user identification information received by the receiving unit is associated as the destination terminal; and
a transmitting unit that transmits the user identification information and the transmission terminal identification information of the transmission terminal serving as the transmission source of the user identification information in association with each other to the requestor terminal extracted by the extracting unit.

The embodiment enables a conference participant to readily grasp who is participating in the conference using which transmission terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission system comprising:
a plurality of transmission terminals; and
a transmission management system that manages the transmission terminals, wherein
each of the transmission terminals comprises circuitry configured to perform:
an acquiring of user identification information identifying a user from a device that stores therein the user identification information; and
a first transmitting of the user identification information to the transmission management system,
the transmission management system comprises circuitry configured to perform:
a first storing of transmission terminal identification information identifying the transmission terminals and transmission states indicating whether the transmission terminals are in transmission in association with each other;
a first receiving of the user identification information from the transmission terminals; and
storing the user identification information in association with the transmission terminal identification information of the transmission terminals serving as transmission sources of the user identification information in the first storing,
the first transmitting of each of the transmission terminals transmits a request for presentation of information relating to transmission terminals in the transmission, to the transmission management system,
the transmission management system further comprises circuitry configured to perform:
a first extracting that refers to, when the first receiving receives the request for presentation from a certain transmission terminal, the first storing and extracts transmission terminal identification information of the transmission terminals in the transmission and user identification information associated with the transmission terminal identification information; and a second transmitting of the extracted transmission terminal identification information and the extracted user identification information in association with each other to the transmission terminal serving as the transmission source of the request for presentation, each of the transmission terminals further comprises circuitry configured to perform:

a second receiving of the transmission terminal identification information and the user identification information; and a displaying of the transmission terminal identification information and the user identification information received by the second receiving in association with each other on a display, the transmission management system further comprises circuitry configured to perform:

a second storing of transmission terminal identification information of a requestor terminal serving as a transmission terminal of a requestor of a request for the transmission with a certain transmission terminal, transmission terminal identification information of a destination terminal serving as a transmission terminal of a destination of the request for the transmission, and a terminal name of the destination terminal in association with one another; and a second extracting that refers to, when the first receiving receives the request for presentation from the certain transmission terminal, the second storing and extracts transmission terminal identification information of a destination terminal with which the transmission terminal serving as a transmission source of the request for presentation is associated as a requestor terminal and a terminal name of the destination terminal, and the second transmitting of the transmission management system transmits, when the transmission terminal identification information extracted by the first extracting is identical to the transmission terminal identification information of the destination terminal extracted by the second extracting, the transmission terminal identification information of the destination terminal, the terminal name of the destination terminal, and the user identification information in association with one another to the transmission terminal serving as the transmission source.

2. The transmission system according to claim 1, wherein the device is a tag wirelessly communicable with the transmission terminals, and the acquiring receives user identification information from the tag via wireless communication.

3. The transmission system according to claim 2, wherein the wireless communication is performed using electromagnetic induction.

4. The transmission system according to claim 2, wherein the wireless communication is performed using microwaves.

5. The transmission system according to claim 1, wherein each of the transmission terminals further comprises circuitry configured to perform an input receiving that receives input of the request for presentation from a user, and the first transmitting transmits, when the input receiving receives the input of the request for presentation, the request for presentation to the transmission management system.

6. A transmission system comprising:

a plurality of transmission terminals; and a transmission management system that manages the transmission terminals, wherein each of the transmission terminals comprises circuitry configured to perform:

an acquiring of user identification information identifying a user from a device that stores therein the user identification information; and a first transmitting of the user identification information to the transmission management system, the transmission management system comprises circuitry configured to perform:

a first storing of transmission terminal identification information identifying the transmission terminals and transmission states indicating whether the transmission terminals are in transmission in association with each other;

a first receiving of the user identification information from the transmission terminals;

extracting, when the first receiving receives the user identification information, transmission terminal identification information associated with the transmission state of an in-transmission state from the first storing; and a second transmitting of the user identification information received by the first receiving unit and transmission terminal identification information of a transmission terminal serving as a transmission source of the user identification information in association with each other to a transmission terminal in the transmission, and each of the transmission terminals further comprises:

a second receiving of the transmission terminal identification information and the user identification information; and a displaying of the transmission terminal identification information and the user identification information received by the second receiving in association with each other on a display, the transmission management system further comprises circuitry configured to perform:

a second storing of transmission terminal identification information of a requestor terminal serving as a transmission terminal of a requestor of a request for the transmission with a certain transmission terminal, transmission terminal identification information of a destination terminal serving as a transmission terminal of a destination of the request for the transmission, and a terminal name of the destination terminal in association with one another; and a second extracting that refers to, when the first receiving receives the request for presentation from the certain transmission terminal, the second storing and extracts transmission terminal identification information of a destination terminal with which the transmission terminal serving as a transmission source of the request for presentation is associated as a requestor terminal and a terminal name of the destination terminal, and the second transmitting of the transmission management system transmits, when the transmission terminal identification information extracted by the first extracting is identical to the transmission terminal identification information of the destination terminal extracted by the second extracting, the transmission terminal identification information of the destination terminal, the terminal name of the destination terminal, and the user identification information in association with one another to the transmission terminal serving as the transmission source.

7. The transmission system according to claim 6, wherein the second transmitting transmits the user identification information in association with the transmission terminal identification information of the transmission source, to all transmission terminals identified by the transmission terminal identification information associated with the transmission state of the in-transmission state in the first storing.

8. The transmission system according to claim 6, wherein
the device is a tag wirelessly communicable with the transmission terminals, and
the acquiring receives the user identification information from the tag via wireless communication.

9. The transmission system according to claim 8, wherein the wireless communication is performed using electromagnetic induction.

10. The transmission system according to claim 8, wherein the wireless communication is performed using microwaves.

11. The transmission system according to claim 8, wherein
the acquiring receives the user identification information via the wireless communication when the wireless communication is established by the tag coming closer to a transmission terminal, and
the first transmitting transmits the user identification information to the transmission management system every time the acquiring receives the user identification information.

12. The transmission system according to claim 6, wherein
each of the transmission terminals further comprises a user identification information memory that stores therein the user identification information acquired by the acquiring,
the first transmitting of each of the transmission terminals transmits, when the acquiring becomes unable to acquire user identification information stored in the user identification information memory, the user identification information to the transmission management system,
the transmission management system further comprises circuitry to perform a user identification information managing that writes, when the first receiving receives user identification information that is not stored in the first storing, the user identification information in association with transmission terminal identification information of a transmission terminal serving as a transmission source of the user identification information, in the first storing and that deletes, when the first receiving receives user identification information stored in the first storing, the user identification information from the first storing, and
the second transmitting performed by the transmission management system transmits, when the first receiving receives user identification information that is not stored in the first storing, the user identification information together with information indicating that a corresponding user is a new participant to the transmission to the transmission terminal and transmits, when the first receiving receives user identification information stored in the first storing, the user identification information together with information indicating that a corresponding user is a leaver from the transmission to the transmission terminal.

13. The transmission system according to claim 6, wherein the transmission management system further comprises circuitry configured to perform:
a third storing to store transmission terminal identification information of a requestor terminal serving as a transmission terminal of a requestor of a request for the transmission and transmission terminal identification information of a destination terminal serving as a transmission terminal of a destination of the request for the transmission in association with each other; and
a requestor terminal identification information extracting that refers to the third storing and extracts transmission terminal identification information of a requestor terminal with which the transmission source of the user identification information is associated as a destination terminal among the transmission terminals in the transmission,
the first storing further further stores terminal names of the transmission terminals in association with the transmission terminal identification information,
the transmission terminal identification information extracting extracts a terminal name of the transmission terminal serving as the transmission source of the user identification information from the first storing, and
the second transmitting transmits the user identification information, the transmission terminal identification information of the transmission source, and the terminal name of the transmission source in association with one another to the requestor terminal with which the transmission source of the user identification information is associated as the destination terminal among the transmission terminals in the transmission.

14. A transmission system comprising:
a plurality of transmission terminals; and
a transmission management system that manages the transmission terminals, wherein
each of the transmission terminals comprises circuitry configured to perform:
an acquiring of user identification information identifying a user from a device that stores therein the user identification information; and
a first transmitting of the user identification information to the transmission management system,
the transmission management system comprises circuitry configured to perform:
a first receiving of the user identification information from the transmission terminals;
storing transmission terminal identification information identifying a requestor terminal serving as a transmission terminal of a requestor of a request for the transmission and transmission terminal identification information identifying a destination terminal serving as a transmission terminal of a destination of the request for the transmission in association with each other;
a requestor terminal identification information extracting that refers to the destination terminal identification information that has been stored and extracts transmission terminal identification information of a requestor terminal with which a transmission terminal serving as a transmission source of user identification information received by the first receiving is associated as a destination terminal; and
a first transmitting of the user identification information and the transmission terminal identification information of the transmission terminal serving as the transmission source of the user identification information in association with each other to the requestor terminal extracted by the requestor terminal identification information extracting, and each of the transmission terminals further comprises circuitry configured to perform:
- a second receiving that receives the transmission terminal identification information and the user identification information; and
- a displaying of the transmission terminal identification information and the user identification information received by the second receiving in association with each other on a display, the transmission management system further comprises circuitry configured to perform:
- a second storing of transmission terminal identification information of a requestor terminal serving as a transmission terminal of a requestor of a request for the transmission with a certain transmission terminal, transmission terminal identification information of a destination terminal serving as a transmission terminal of a destination of the request for the transmission, and a terminal name of the destination terminal in association with one another; and
- a second extracting that refers to, when the first receiving receives the request for presentation from the certain transmission terminal, the second storing and extracts transmission terminal identification information of a destination terminal with which the transmission terminal serving as a transmission source of the request for presentation is associated as a requestor terminal and a terminal name of the destination terminal, and the second transmitting of the transmission management system transmits, when the transmission terminal identification information extracted by the first extracting is identical to the transmission terminal identification information of the destination terminal extracted by the second extracting, the transmission terminal identification information of the destination terminal, the terminal name of the destination terminal, and the user identification information in association with one another to the transmission terminal serving as the transmission source.

15. The transmission system according to claim 14, wherein the transmission management system further comprises configured to perform:
- a transmission state storing of any one of transmission states of an in-transmission state, a transmittable state, and a non-transmittable state in association with transmission terminal identification information of each of the transmission terminals; and
- a transmission terminal identification information extracting that extracts transmission terminal identification information of a requestor terminal associated with the transmission state of the in-transmission state or the transmittable state which has been stored among the requestor terminal extracted by the requestor terminal identification information extracting, and the first transmitting transmits user identification information and transmission terminal identification information of a transmission terminal serving as a transmission source of the user identification information in association with each other to the requestor terminal extracted by the transmission terminal identification information extracting.

16. The transmission system according to claim 14, wherein the transmission management system further comprises circuitry configured to perform:
- storing user identification information received by the first receiving and transmission terminal identification information of a transmission terminal serving as a transmission source of the user identification information in association with each other in a transmission state memory; and
- a user identification information extracting that refers to, when the first receiving receives a request for presentation together with transmission terminal identification information of a certain destination terminal from a transmission terminal, the transmission state storage and extracts user identification information associated with the transmission terminal identification information of the certain destination terminal, and the first transmitting transmits the user identification information extracted by the user identification information extracting to the transmission terminal serving as the transmission source of the request for presentation.

17. The transmission system according to claim 16, wherein:

each of the transmission terminals further comprises a user identification information memory that stores therein the user identification information acquired by the acquiring, the first transmitting of each of the transmission terminals transmits, when the acquiring becomes unable to acquire user identification information stored in the user identification information memory, the user identification information that becomes unable to be acquired to the transmission management system, and the storing of user identification information received by the first receiving further comprises, when the first receiving unit receives user identification information that is not stored in the user identification information memory, writing the user identification information in association with transmission terminal identification information of a transmission terminal serving as a transmission source of the user identification information in the user identification information memory and deletes, when the first receiving receives user identification information stored in the user identification information memory, the user identification information from the user identification information memory.

18. The transmission system according to claim 14, wherein the device is a tag wirelessly communicable with the transmission terminals, and the acquiring receives the user identification information from the tag via wireless communication.

19. The transmission system according to claim 18, wherein the acquiring receives the user identification information via the wireless communication when the wireless communication is established by the tag coming closer to a transmission terminal, and the first transmitting transmits the user identification information to the transmission management system every time the acquiring receives the user identification information.

* * * * *